(12) United States Patent
Akimoto

(10) Patent No.: US 12,437,700 B2
(45) Date of Patent: Oct. 7, 2025

(54) LIGHT EMITTING DEVICE AND METHOD FOR DRIVING LIGHT EMITTING DEVICE

(71) Applicant: NICHIA CORPORATION, Anan (JP)

(72) Inventor: Hajime Akimoto, Anan (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 18/851,697

(22) PCT Filed: Jan. 23, 2023

(86) PCT No.: PCT/JP2023/001922
§ 371 (c)(1),
(2) Date: Sep. 27, 2024

(87) PCT Pub. No.: WO2023/188730
PCT Pub. Date: Oct. 5, 2023

(65) Prior Publication Data
US 2025/0209958 A1    Jun. 26, 2025

(30) Foreign Application Priority Data
Mar. 31, 2022 (JP) ................. 2022-058939

(51) Int. Cl.
*H05B 45/10* (2020.01)
*G09G 3/20* (2006.01)
(Continued)

(52) U.S. Cl.
CPC ............. *G09G 3/2092* (2013.01); *G09G 3/32* (2013.01); *G09G 2320/0242* (2013.01);
(Continued)

(58) Field of Classification Search
CPC .. G09G 3/06; G09G 3/20; G09G 3/32; G09G 3/34; G09G 3/36; G09G 3/2092;
(Continued)

(56) References Cited

U.S. PATENT DOCUMENTS

2005/0168564 A1    8/2005  Kawaguchi et al.
2007/0242016 A1   10/2007  Choi
(Continued)

FOREIGN PATENT DOCUMENTS

JP    2002-237619    8/2002
JP    2005-216711    8/2005
(Continued)

*Primary Examiner* — Chanh D Nguyen
*Assistant Examiner* — Nguyen H Truong
(74) *Attorney, Agent, or Firm* — MORI & WARD, LLP

(57) ABSTRACT

A light emitting device including a plurality of light emitting elements for emitting light of different colors depending on a drive current. The device includes a display, a current driver that supplies the drive current, a lighting controller that controls the current driver so that the light emitting elements emit light of a predetermined emission color and luminance, and an information storage that stores current-chromaticity information for determining a drive current value for driving the light emitting elements, in accordance with the emission color to be emitted by the light emitting elements. The lighting controller determines the drive current value for driving the light emitting elements and an ON period for lighting the light emitting elements by referring to the current-chromaticity information, in accordance with the predetermined emission color and gradation information, and performs lighting driving of the light emitting elements using the drive current from the current driver.

20 Claims, 13 Drawing Sheets

(51) Int. Cl.
*G09G 3/32* (2016.01)
*H05B 45/20* (2020.01)

(52) U.S. Cl.
CPC ............ *G09G 2320/041* (2013.01); *G09G 2320/0626* (2013.01); *G09G 2320/0666* (2013.01)

(58) Field of Classification Search
CPC ..... G09G 2320/0242; G09G 2320/041; G09G 2320/0626; G09G 2320/0666; H05B 33/00; H05B 41/16; F21S 4/10; G08B 21/18
See application file for complete search history.

(56) References Cited

U.S. PATENT DOCUMENTS

2011/0101881 A1* 5/2011 Kamikawa ............... G09G 3/14
 315/250
2021/0091268 A1 3/2021 Dierolf et al.
2022/0157230 A1 5/2022 Suzuki
2024/0021145 A1* 1/2024 Lee ..................... G09G 3/2003
2025/0157388 A1* 5/2025 Zhu ......................... G09G 3/32

FOREIGN PATENT DOCUMENTS

| | | |
|---|---|---|
| JP | 2006-344913 | 12/2006 |
| JP | 2007-080998 | 3/2007 |
| JP | 2007-286572 | 11/2007 |
| JP | 2010-008769 | 1/2010 |
| JP | 2014-505275 | 2/2014 |
| JP | 6788088 B2 | 5/2020 |
| JP | 2021-052168 | 4/2021 |
| WO | WO 2012/097383 | 7/2012 |
| WO | WO 2020-202766 | 10/2020 |

* cited by examiner

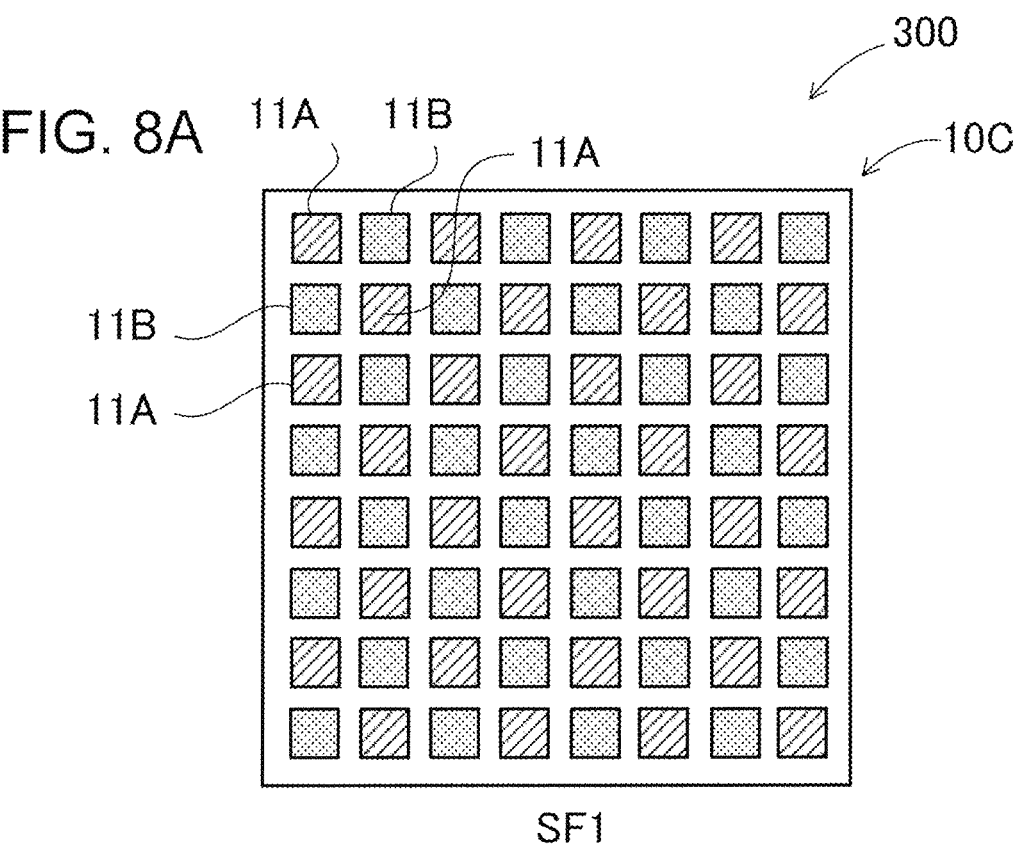
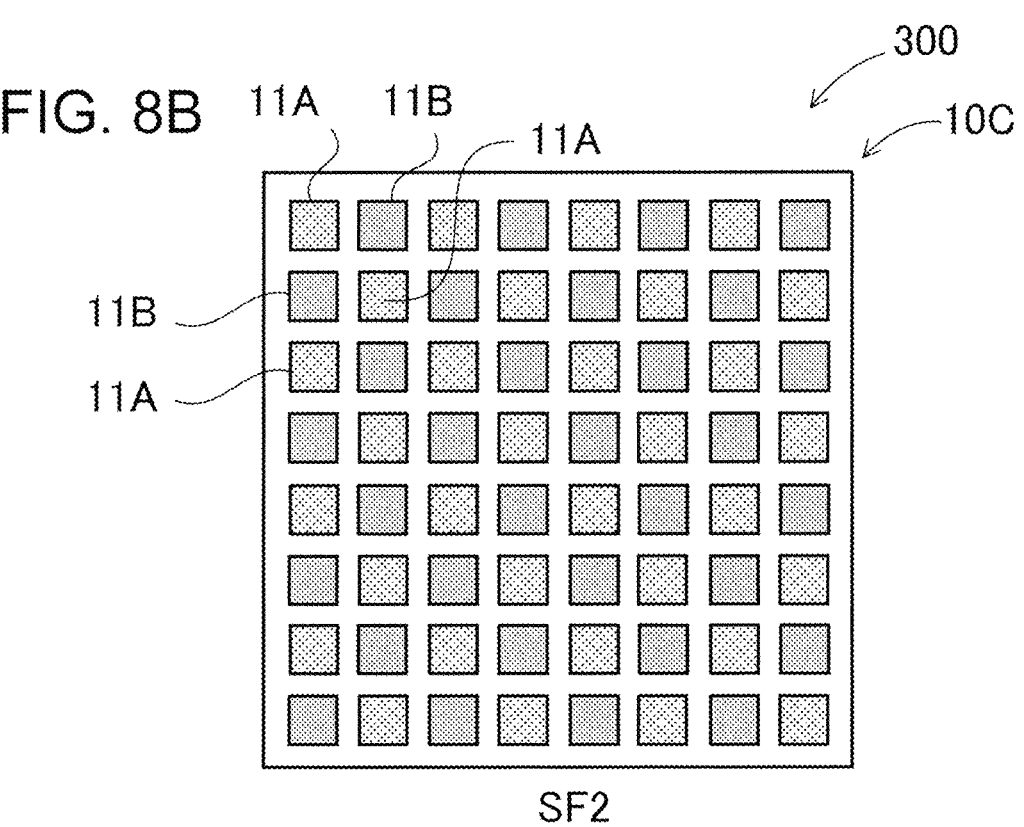

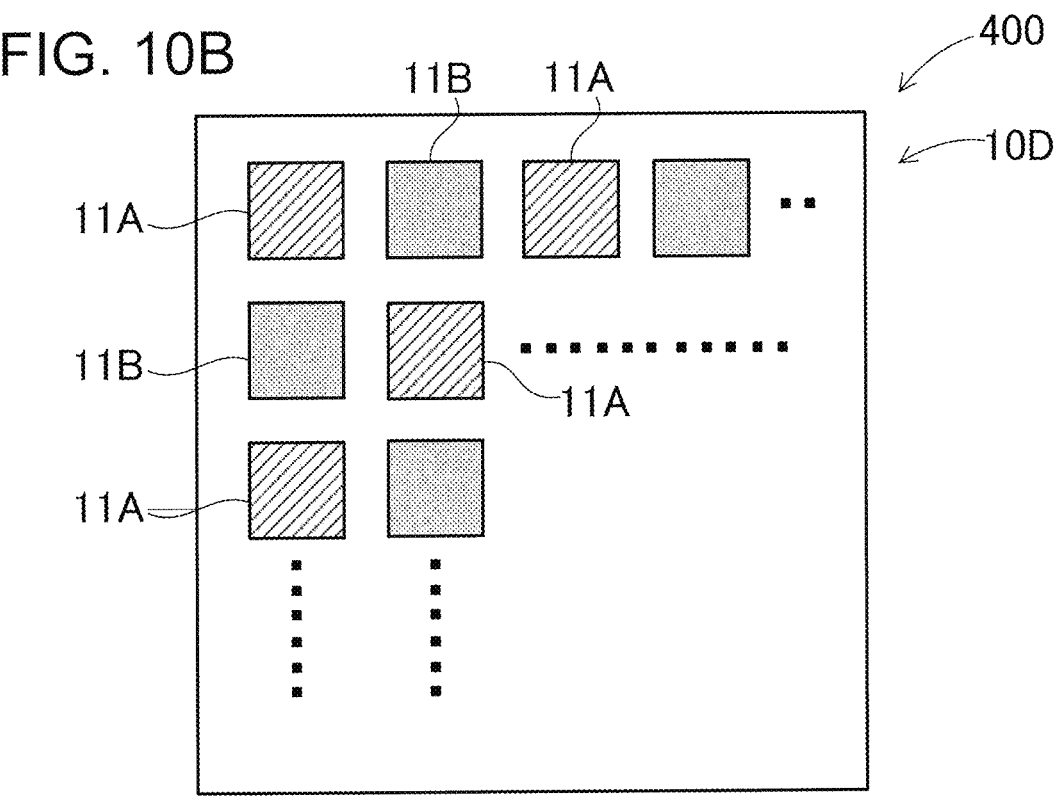
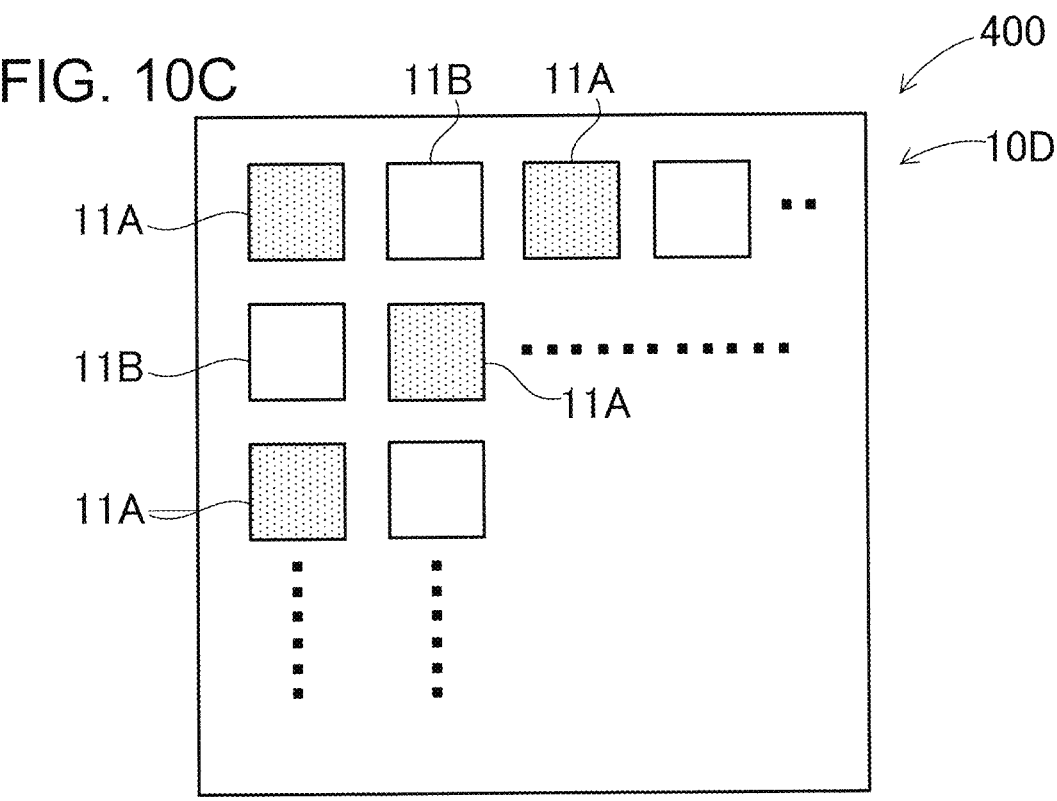

LIGHT EMITTING DEVICE AND METHOD FOR DRIVING LIGHT EMITTING DEVICE

TECHNICAL FIELD

The present disclosure relates to a light emitting device and a method for driving the light emitting device.

BACKGROUND ART

Displays and surface light emitting devices using semiconductor light emitting elements, such as LEDs and LDs, are used. Here, in order to manufacture a full-color LED display, it is generally necessary to arrange sub-pixels of at least the three colors of RGB for each of pixels. However, in such a configuration, since it is necessary to provide at least three times as many of the sub-pixels as the pixels, this configuration is not suitable for high definition, and there are problems such as high cost and a decrease in yield due to the increase in the number of LEDs.

On the other hand, a micro-LED display has been reported that causes a single LED element to emit multicolor light (see JP 2021-52168 A). However, with respect to configuring a display using such a multicolor light emitting micro-LED, an actual circuit configuration and driving method have not yet been reported.

SUMMARY

A light emitting device and a method for driving the light emitting device are provided that are capable of realizing appropriate driving when configuring a light emitting device, such as a display, using multicolor light emitting semiconductor light emitting elements.

According to an aspect of the present invention, a light emitting device includes a plurality of light emitting elements configured to emit light of different emission colors depending on a drive current, a display in which the plurality of light emitting elements are arranged, a current driver configured to supply the drive current to the plurality of light emitting elements, a lighting controller configured to control the current driver to supply the drive current to each of the plurality of light emitting elements, to cause the light emitting elements to emit light of a predetermined emission color and luminance, and an information storage configured to store current-chromaticity information used for determining a drive current value to drive the light emitting element, in accordance with the emission color to be emitted by the light emitting element. The lighting controller is configured to determine the drive current value to drive each of the light emitting elements and an ON period for turning on each of the light emitting elements, by referring to the current-chromaticity information stored in the information storage, in accordance with the predetermined emission color and gradation information for each of the light emitting elements, and to perform lighting driving of each of the light emitting elements using the drive current from the current driver. For each of pixels of the display, each of the light emitting elements emits light of a first wavelength driven by a first drive current, and emits light of a second wavelength driven by a second drive current, the second drive current being greater than the first drive current, and the second wavelength being shorter than the first wavelength. For determining the emission color of each of the light emitting elements, the lighting controller calculates a first ON period, during which each of the light emitting elements emits the emission color of the first wavelength, and a second ON period, during which each of the light emitting elements emits the emission color of the second wavelength. In one frame of one image displayed on the display, the lighting controller performs driving control of each of the light emitting elements in order for a period in which the plurality of light emitting elements are turned on and off to include at least a first maximum light emission period including the first ON period during which the light emitting element emits the light of the first light emission wavelength and a second maximum light emission period including the second ON period during which the light emitting element emits the light of the second wavelength.

According to another aspect of the present invention, a driving method is a driving method for causing a plurality of light emitting elements to emit light, using a light emitting device including a display in which the plurality of light emitting elements configured to emit light of different emission colors depending on a drive current are arranged in a matrix, a current driver configured to supply the drive current to the plurality of light emitting elements, a lighting controller configured to control the current driver to supply the drive current to each of the plurality of light emitting elements, to cause the light emitting elements to emit light of a predetermined emission color and luminance, and an information storage configured to store current-chromaticity information used for determining a drive current value to drive the light emitting element, in accordance with the emission color to be emitted by the light emitting element. The driving method includes a step of the lighting controller determining the drive current value to drive each of the light emitting elements and an ON period for turning on each of the light emitting elements, by referring to the current-chromaticity information stored in the information storage, in accordance with the predetermined emission color and gradation information for each of the light emitting elements. The driving method includes, for determining the emission color of each of the light emitting elements, a step of the lighting controller calculating a first ON period, during which each of the light emitting elements emits the emission color of a first wavelength, and a second ON period, during which each of the light emitting elements emits the emission color of a second wavelength, for each of pixels of the display, each of the light emitting elements emitting light of the first wavelength driven by a first drive current, and emitting light of the second wavelength when driven by a second drive current, the second drive current being greater than the first drive current, and the second wavelength being shorter than the first wavelength. The driving method includes a step of, in one frame of one image displayed on the display, the lighting controller performing driving control of each of the light emitting elements in order for a period in which the plurality of light emitting elements are turned on and off to include at least a first maximum light emission period including the first ON period during which the light emitting element emits the light of the first wavelength and a second maximum light emission period including the second ON period during which the light emitting element emits the light of the second wavelength.

ADVANTAGEOUS EFFECTS OF INVENTION

In this way, it is possible to realize lighting control of a display constituted by multicolor light emitting elements.

BRIEF DESCRIPTION OF DRAWINGS

FIG. 8A is a schematic diagram illustrating a light emission pattern in a first sub-frame of the display illustrated in FIG. 7.

FIG. 8B is a schematic diagram illustrating a light emission pattern in a second sub-frame of the display illustrated in FIG. 7.

FIG. 10B is a schematic diagram illustrating a light emission pattern in the first sub-frame and the third sub-frame of the display illustrated in FIG. 10A.

FIG. 10C is a schematic diagram illustrating a light emission pattern in the second sub-frame of the display illustrated in FIG. 10A.

DESCRIPTION OF EMBODIMENTS

Figure 1:
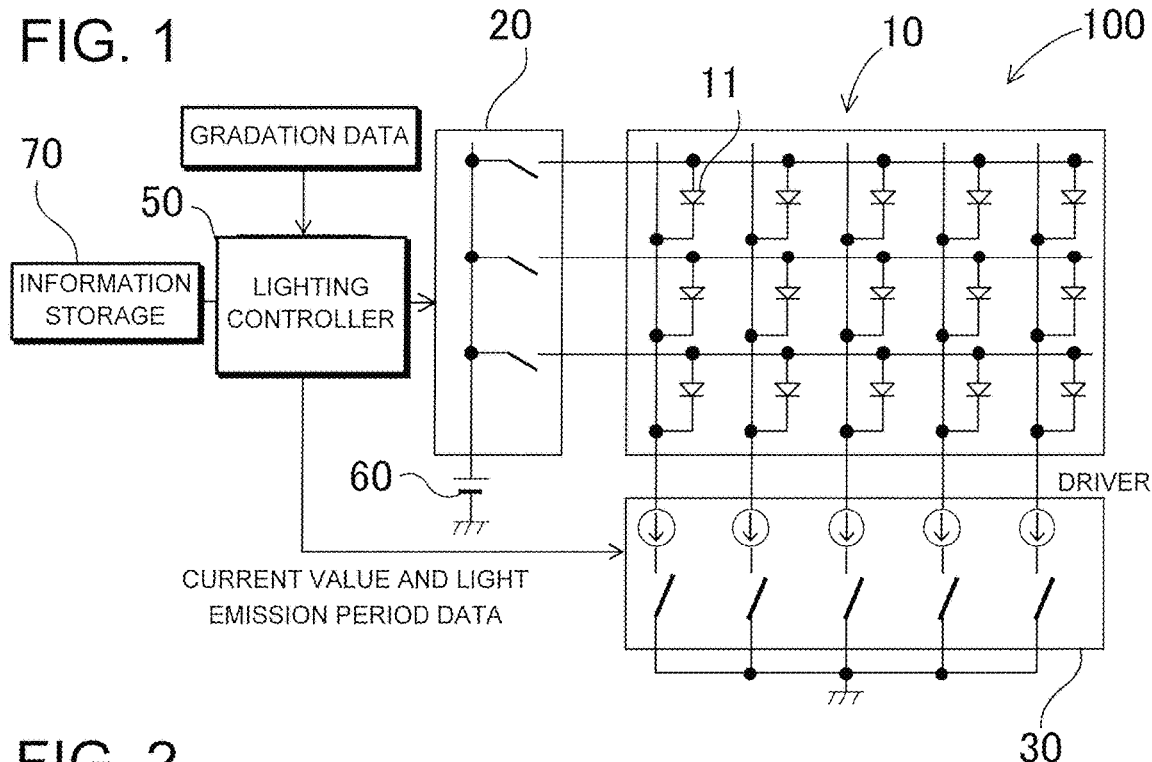
FIG. 1 is a block diagram illustrating a light emitting device according to a first embodiment.

Hereinafter, the present invention will be described in more detail with reference to the drawings. In the following description, terms indicating specific directions or positions (e.g., "upper", "lower", and other terms including those terms) are used as necessary. The use of those terms, however, is to facilitate understanding of the invention with reference to the drawings, and the technical scope of the present invention is not limited by the meaning of those terms. Parts having the same reference signs appearing in a plurality of drawings indicate identical or equivalent parts or members.

Further, the following embodiments exemplify specific examples of the technical idea of the present invention, and the present invention is not limited to the following embodiments. The dimensions, materials, shapes, relative arrangements, and the like of constituent elements described below are not intended to limit the scope of the present invention to those alone but are intended to provide an example, unless otherwise specified. The contents to be described in an embodiment and an example can be applied to another embodiment and another example. The size, positional relationship, and the like of the members illustrated in the drawings can be exaggerated in order to clarify the explanation.

First Embodiment

A block diagram of a light emitting device 100 according to a first embodiment is illustrated in FIG. 1. The light emitting device 100 illustrated in this drawing includes a display 10, a current driver 30, a lighting controller 50, an information storage 70, a scanner 20, and a power supply 60.

A multicolor light emitting micro-LED emits light of a long wavelength using a small current, and emits light of a short wavelength using a large current. Thus, in order to display light of a short wavelength and light of a long wavelength on one display by appropriately adjusting luminance and color, when using a plurality of multicolor light emitting micro-LED elements, it is necessary to control a light emission period in a range of approximately 3-fold to 30-fold depending on the wavelength.

However, if a timing is shifted depending on a required chromaticity, there is a problem that a color separation phenomenon occurs, particularly when a moving image is displayed. For example, a field sequential method is known in which light is emitted while RGB is sequentially repeated for each of fields. In the field sequential method, since pixels are of an active matrix type, it is necessary to secure a certain light emission period after display data is written into a row selected by scanning. Thus, a scanning period and the light emission period of each of the rows are defined independently. Thus, in the field sequential method, the light emission is performed not on a row-by-row basis but on a sub-field-by-sub-field basis, which causes a problem that color separation occurs as a side effect. In particular, when the moving image is displayed, there is a problem that color separation is conspicuous.

Here, in the light emitting device 100 according to the present embodiment, the occurrence of the color separation phenomenon is suppressed when configuring a light emitting device, such as a display, using multicolor light emitting semiconductor light emitting elements. A detailed description is given below.

The display 10 includes a plurality of light emitting elements 11. The plurality of light emitting elements 11 are arranged in rows and columns or in a matrix, and each of the light emitting elements 11 constitutes a pixel of the display 10. Each of the light emitting elements 11 is an element capable of emitting light of a different emission color depending on a drive current.

Light Emitting Element 11

As the light emitting element 11 as described above, a semiconductor light emitting element, such as a light emitting diode (LED), a semiconductor laser (LD), and the like can be favorably used. As the LED, a semiconductor layered body including a light emitting portion (hereinafter, also simply referred to as the "semiconductor layered body") having one or a plurality of layers can be used. The semiconductor layered body has light emitting characteristics, and such a semiconductor layered body is produced by layering a plurality of semiconductor layers of ZnS, SiC, GaN, GaP, InN, AlN, ZnSe, GaAsP, GaAlAs, InGaN, GaAlN, AlInGaP, AlInGaN or the like on a substrate by liquid phase epitaxy, HVPE or MOCVD, and forming a light emitting layer on any one of the semiconductor layers. By selecting a material of the semiconductor layer and an alloy ratio thereof, the wavelength of the light emitting portion can be selected variously from ultraviolet light to infrared light. In particular, in a case of a display device that can be suitably used outdoors, a semiconductor layered body that can emit light with high luminance is required. Therefore, it is preferable to select a nitride semiconductor as a material of the light emitting portion that emits green light and blue light with high luminance. For example, $In_XAl_YGa_{1-X-Y}N$ ($0 \leq X \leq 1$, $0 \leq Y \leq 1$, and $X+Y \leq 1$) or the like can be used as the material of the light emitting portion. In order to obtain a color display device, it is preferable to combine semiconductor layered bodies having wavelengths of red light in a range from 610 nm to 700 nm, wavelengths of green light in a range from 495 nm to 565 nm, and wavelengths of blue light in a range from 430 nm to 490 nm.

Each of the light emitting elements 11 emits light of a different emission color depending on the drive current, for each of the pixels of the display 10. For example, when driven by a first drive current, light of a first wavelength, such as green light, is emitted, for example, and when driven by a second drive current that is larger than the first drive current, light of a second wavelength shorter than the first wavelength, such as blue light, is emitted, for example.

The plurality of light emitting elements 11 are connected to a plurality of common lines and a plurality of drive lines. The plurality of light emitting elements 11 are connected to one of the common lines and one of the plurality of drive lines, respectively, and arranged in a matrix to constitute the display 10.

The scanner 20 selects a chosen row as a target to be turned on, in the display 10 in which the plurality of light emitting elements 11 are arranged in the matrix. The display 10 sequentially switches the rows selected by the scanner 20 to emit light. For example, the scanner 20 includes one or more source drivers to apply a voltage to the plurality of common lines in a time-division manner. Further, the power supply 60 is connected to the scanner 20, and supplies power to drive elements, such as transistors, constituting the scanner 20. In the example illustrated in FIG. 1, an anode common connection is adopted, in which the anode side of the light emitting element 11 is connected to the power supply side.

The current driver 30 supplies the drive current to the plurality of light emitting elements 11. A constant current source or the like can be favorably used as the current driver 30. In the light emitting device 100 illustrated in this drawing, lighting driving of each of the pixels is performed by a passive matrix driving method. For example, the current driver 30 is constituted by one or more current sink drivers for drawing a current at a predetermined timing from the drive line connected to the light emitting element 11 that is the lighting target, among the plurality of drive lines. Further, the current driver 30 is provided with a memory for temporarily storing a drive current value, for each of the light emitting elements, that is determined by the lighting controller 50.

Further, the lighting controller 50 controls operations of the scanner 20 and the current driver 30. The lighting controller can be realized by hardware such as a predetermined gate array (FPGA, ASIC), by software, or by a mixture thereof.

The lighting controller 50 receives data to be displayed from an external display source, for example. Then, based on the received display data, lighting control data for driving the scanner 20 and the current driver 30 is generated. Here, a frame is a screen of a state in which one image is displayed on the display. One frame is divided into light emission periods for each of a plurality of rows, and the lighting control data is generated so that an instructed gradation is assigned to each light emission period. Based on the lighting control data generated in this way, the scanner 20 and the current driver 30 are operated to perform the lighting driving of each of the light emitting elements 11. The screen for one frame displayed on the display 10 is displayed over one cycle in which the scanner 20 scans the common lines once.

The information storage 70 determines the drive current value for driving the light emitting element 11 in accordance with the emission color to be emitted by the light emitting element 11. For this reason, the information storage 70 stores current-chromaticity information indicating the emission color to be emitted by the light emitting element 11 and a correspondence relationship that determines the current value for emitting this color. For example, the information storage 70 may be provided with a current-chromaticity data memory.

The information storage 70 may store the current-chromaticity information that is created by measuring the drive current and the emission color of each of the light emitting elements 11 equivalent to those arranged in the display 10. Alternatively, the information storage 70 may store the current-chromaticity information that is recorded by statistically determining the relationship between the drive current and the emission color of the plurality of light emitting elements 11.

The lighting controller 50 controls the current driver 30 to supply the drive current to each of the plurality of light emitting elements 11 so that the light emitting elements 11 emit light with a predetermined emission color and luminance. Specifically, the lighting controller 50 determines the drive current value for driving each of the light emitting elements 11 and an ON period for lighting each of the light emitting elements 11, by referring to the current-chromaticity information stored in the information storage 70 in accordance with the predetermined emission color and gradation information for each of the light emitting elements 11, and performs the lighting driving of each of the light emitting elements 11 using the drive current from the current driver 30. For example, the lighting controller 50 drives and controls each of the light emitting elements 11 such that, in each of the light emission periods corresponding to each of the rows further constituting the one frame of the one image displayed on the display 10, the light emission period includes a first ON period in which the light emitting elements 11 are lit by a current value for emitting light of the first wavelength, and a second ON period in which the light emitting elements 11 are lit by a current value for emitting light of the second wavelength.

Further, the lighting controller 50 performs gradation control of the luminance. For example, the drive current value of each of the light emitting elements 11 is determined by referring to the current-chromaticity information in accordance with the predetermined emission color of each of the light emitting elements 11, and the ON period of each of the light emitting elements 11 is determined in accordance with the determined drive current value and with the predetermined gradation information for each of the light emitting elements 11.

Further, the light emitting device 100 may be provided with a memory for temporarily storing the determined drive current value for each of the light emitting elements 11. The memory is installed in the current driver 30, for example. The lighting controller 50 controls the current driver 30 based on the drive current value of each of the light emitting elements 11 stored in the memory.

Furthermore, the lighting controller 50 may cause the current driver 30 to simultaneously perform lighting control of the light emitting elements 11 in a state in which ON period information, corresponding to the one image, of each of the light emitting elements 11 of the display 10, is written into the memory.

The lighting controller 50 determines the drive current value for driving each of the light emitting elements 11 and the light emission period for emitting the light by referring to the current-chromaticity information stored in the information storage 70 in accordance with the emission color and the gradation information for each of the light emitting elements 11 that are imparted from the outside, and performs the lighting driving of each of the light emitting elements 11 using the current driver 30. With such a configuration, the lighting control of the display 10 constituted by the multi-color light emitting light emitting elements 11 can be realized.

When the drive current values for emitting red (R), green (G), and blue (B) light are IR, IG, and IB, respectively, the magnitudes of the drive current values satisfy IR<IG<IB. Thus, when the light emission periods of the maximum gradations of the respective colors are TR, TG, and TB, a relationship between the lengths of the maximum light emission periods of the respective colors in white display corresponding to full lighting is TR>TG>TB. Thus, it is preferable that the lighting driving of the light emitting elements 11 is performed separately for each of RGB.

Here, the light emission of RGB is performed for each of the rows by the same light emitting element 11 in the order of RGB. Thus, full-color light emission can be realized by the single light emitting element 11 without the color separation occurring. PWM can be used for the gradation control of each of the emission colors. Here, products of the maximum light emission periods by the PWM driving and the drive current values satisfy R>G>B. This is because luminance efficiency of the light emitting element 11 is higher in the order of R<G<B.

Timing Chart

Figure 2:
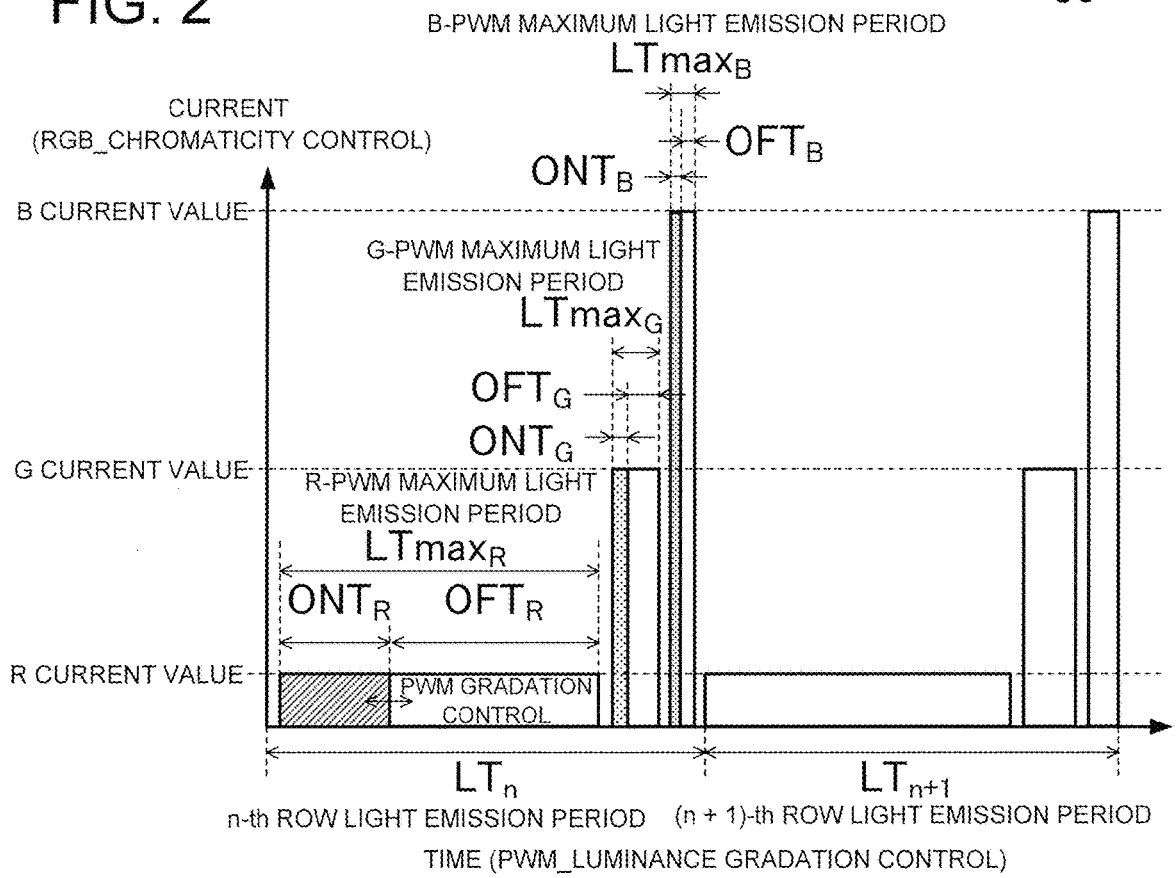
FIG. 2 is a timing chart showing lighting timings of each of RGB colors in the light emitting device illustrated in FIG. 1.

FIG. 2 is a timing chart showing lighting timings of each of the RGB colors of the light emitting device 100 illustrated in FIG. 1. Here, a light emission period $LT_n$ is a period during scanning (including all of RGB) of n rows in the matrix of the display 10 when the passive matrix driving method is used. Note that, in the case of an active matrix driving method to be described later, the light emission period is the period of one frame. Further, a maximum light emission period LTmax is a period when a maximum gradation (256 gradations in the case of 8 bits) of each color is reached by the PWM control. In FIG. 2, a PWM maximum light emission period of red light is $LTmax_R$, a PWM maximum light emission period of green light is $LTmax_G$, and a PWM maximum light emission period of blue light is $LTmax_B$. Further, an ON period ONT is a time period during which the light emitting element emits light during the maximum light emission period in order to obtain a necessary luminance. In FIG. 2, an ON period of red light is $ONT_R$, an ON period of green light is $ONT_G$, and an ON period of blue light is $ONT_B$. In each of the drawings, including the following drawings, in order to show differences in the emission colors of the light emitting elements 11, a portion corresponding to red (R) is indicated by oblique lines, a portion corresponding to green (G) is indicated by dots, and a portion corresponding to blue (B) is indicated by light hatching.

As shown in FIG. 2, in the passive matrix driving method, the rows or columns in the matrix forming the display 10 are sequentially scanned to perform the lighting driving. For example, when the light emitting elements 11 are turned on by switching the scanning for each of the rows, the gradation control is performed by PWM control in the order of RGB in each of the light emission period $LT_n$ of a chosen n-th row and a light emission period $LT_{n+1}$ of an n+1-th row. That is, in the red light PWM maximum light emission period $LTmax_R$ which is the period in which R is turned on, the light emitting element 11 emits light using a drive current value for emitting red light for a time period required to obtain a desired luminance of the red light by the gradation control, that is, until the red light ON period $ONT_R$, and is turned off in the remaining period. In other words, the red light ON period $ONT_R$ is followed by a red light OFF period $OFT_R$. Next, also in the green light PWM maximum light emission period $LTmax_G$ which is the period in which G is turned on, the drive current value for emitting green light is supplied to the light emitting element 11 for the time period required to obtain a desired luminance of the green light by the gradation control, that is, until the green light ON period $ONT_G$, and the remaining period is a green light OFF period $OFT_G$ in which the light emitting element 11 is turned off. Further, also in the blue light PWM maximum light emission period $LTmax_B$ which is the period in which B is turned on, in a similar manner, the drive current value for emitting blue light is supplied to the light emitting element 11 for the time period required to obtain a desired luminance of the blue light by the gradation control, that is, until the blue light ON period $ONT_B$, and the remaining period is a blue light OFF period $OFT_B$ in which the light emitting element 11 is turned off. In this way, by sequentially turning on the light emitting elements from the long wavelength light having the relatively long ON period to the short wavelength light, in other words, from the small drive current value to the large drive current value, it is possible to avoid difficulties in the luminance control caused by a temperature rise of the light emitting elements.

Further, when the RGB light is sequentially emitted in a line sequential manner as illustrated in FIG. 2, the light emission timings averaged for each of RGB in one frame are aligned, and thus it is possible to avoid the occurrence of color separation as in the field sequential method. In other words, this can be expressed as avoiding color separation when displaying the moving image, by aligning temporal centers of gravity of the ON periods of each of the emission colors in one frame.

Further, in the case of monochrome display or the like, two color, such as B and yellow (Y), may be realized. FIG.

Figure 4A:
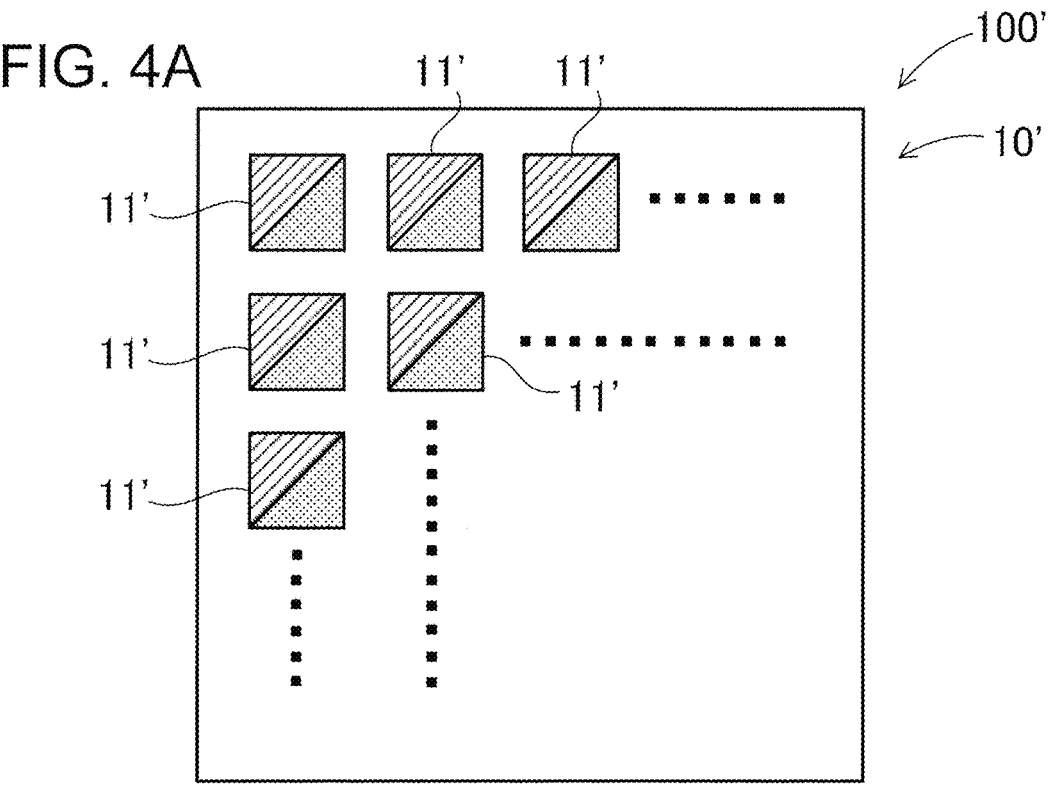
FIG. 4A is a schematic diagram illustrating a display of a light emitting device according to a modified example.
Figure 4B:
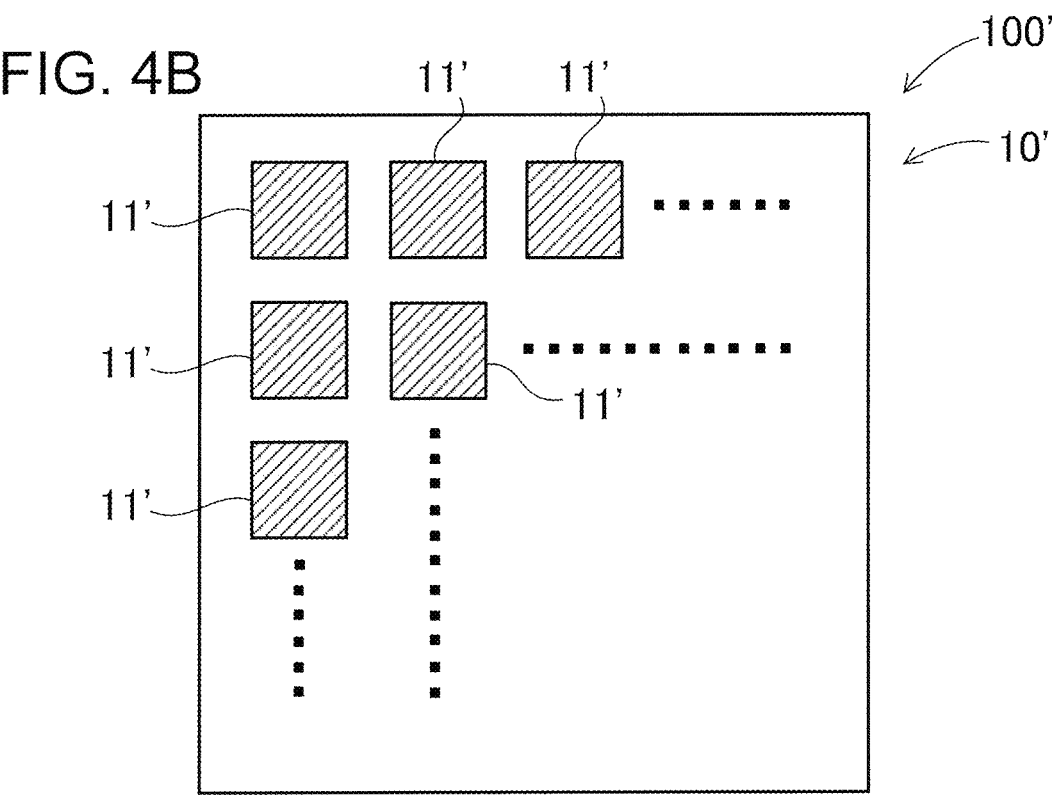
FIG. 4B is a schematic diagram illustrating a light emission pattern when the display in FIG. 4A emits light of a first wavelength.
Figure 4C:
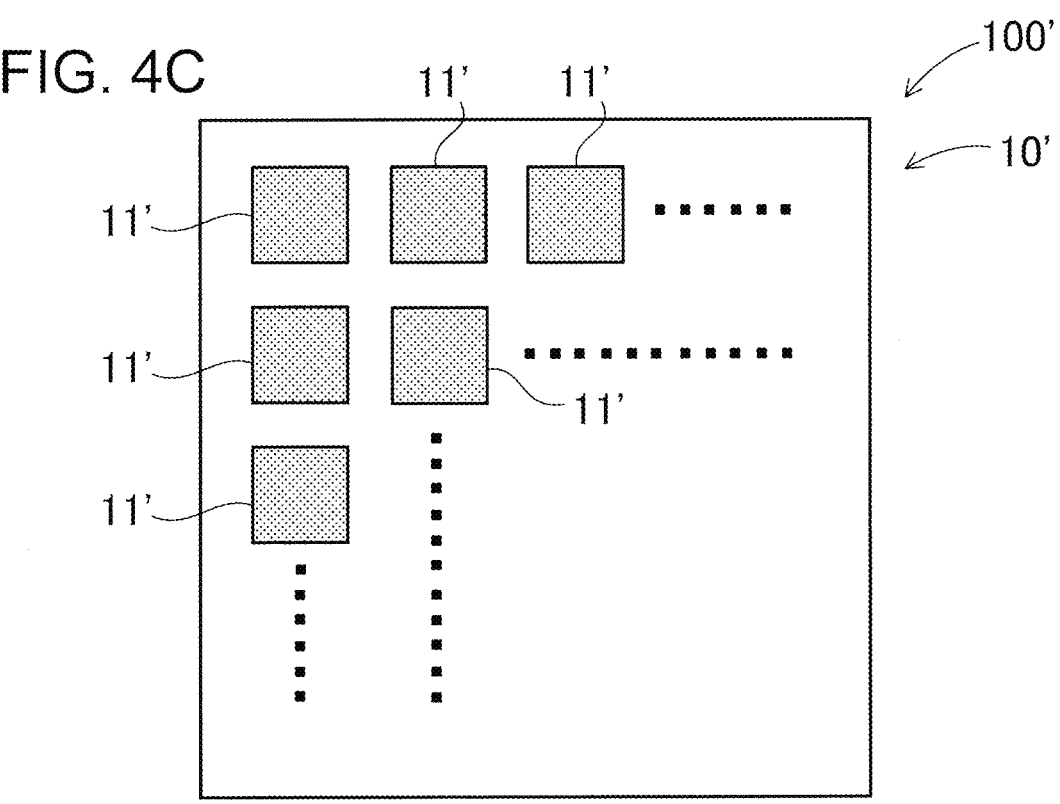
FIG. 4C is a schematic diagram illustrating a light emission pattern when the display in FIG. 4A emits light of a second wavelength.

3 shows an example of lighting driving of a light emitting device configured to emit light of the two colors of R and G. As shown in this drawing, the light emission period $LT_n$ of the n-th row includes the red light PWM maximum light emission period $LTmax_R$ for causing the light emitting element of R to emit light and the green light PWM maximum light emission period $LTmax_G$ for causing the light emitting element of G to emit light, and gradation control is performed by PWM for each. Further, in the light emitting device realizing such lighting driving, the light emitting element capable of emitting RGB light depending on the drive current value as illustrated in FIG. 1 may be used, or the display may be constituted by the light emitting element capable of emitting light of the first wavelength and light of the second wavelength. Such an example is illustrated in FIGS. 4A to 4C as a light emitting device 100' according to a modified example. Here, each of the light emitting elements 11' can emit light of the first wavelength (for example, red as illustrated in FIG. 4B) and light of the second wavelength (for example, green as illustrated in FIG. 4C). In order to show that the light emitting element 11' forming each of the pixels changes the emission color between the first wavelength and the second wavelength in accordance with the maximum light emission period LTmax, FIG. 4A schematically shows the two different emission colors by dividing a rectangle into two using a diagonal line (this does not mean that the light emitting element 11' emits light in a triangular shape).

Method for Driving Light Emitting Device

Here, a method for driving the light emitting device is described. First, the lighting controller 50 illustrated in FIG. 1 refers to the current-chromaticity information stored in the information storage 70, and determines the drive current value for driving each of the light emitting elements 11 and the ON period for lighting each of the light emitting elements 11, in accordance with the predetermined emission color and gradation information for each of the light emitting elements 11. Then, the lighting driving of each of the light emitting elements 11 is performed by the current driver 30 based on the determined drive current value and ON period.

Figure 3:
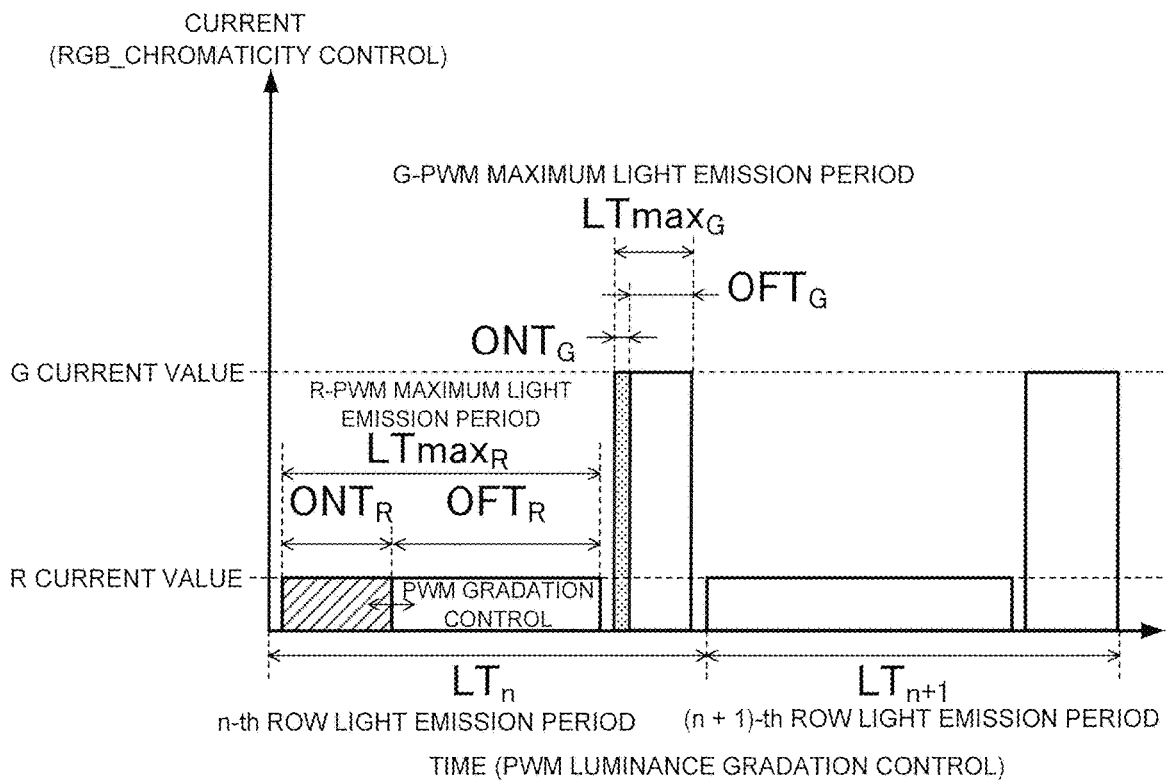
FIG. 3 is a timing chart showing lighting timings of emission colors of G and R in the light emitting device illustrated in FIG. 1.

Further, based on the content of the information storage 70 in which the current-chromaticity data is written in advance, and on the gradation information, the current value and light emission period data are determined and written into the current driver 30. Based on this data, the current driver 30 causes each of the pixels to emit light using the predetermined current value for the ON period ONT. Note that the current value is determined from the current-chromaticity information, and the light emission period is determined from the determined current value and luminance data. For example, in FIG. 2, when the light of the first wavelength is the green light, the green light ON period $ONT_G$ is the first ON period, and when the light of the second wavelength is the blue light, the blue light ON period $ONT_B$ is the second ON period. Further, in the example in FIG. 3, when the light of the first wavelength is the red light, the red light ON period $ONT_R$ is the first ON period, and when the light of the second wavelength is the green light, the green light ON period $ONT_G$ is the second ON period.

Second Embodiment

Figure 5:
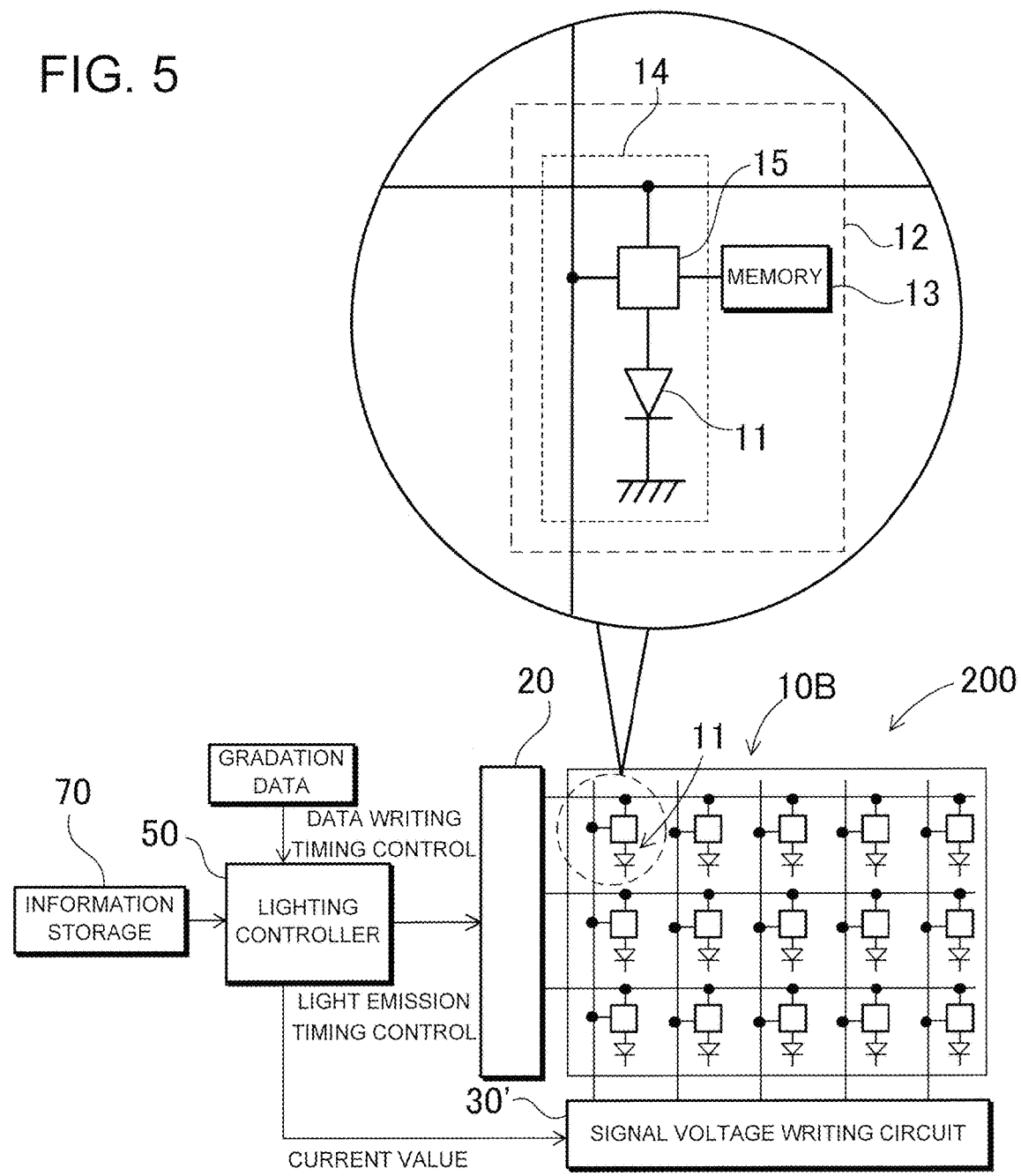
FIG. 5 is a block diagram, with a partially enlarged view attached, illustrating a light emitting device according to a second embodiment.

In the example above, the light emitting device 100 adopting the lighting driving using the passive matrix driving method is described. However, in the present invention, the lighting driving system is not limited to the passive matrix driving method, and other systems, such as an active matrix driving method, for example, can be applied. An example of adopting the active matrix driving method is illustrated in FIG. 5, as a light emitting device 200 according to a second embodiment. Note that the same members as those in FIG. 1 are denoted by the same reference signs, and a detailed description thereof is omitted. The light emitting device 200 illustrated in FIG. 5 is provided with a display 10B, the scanner 20, the lighting controller 50, the information storage 70, and a signal voltage writing circuit 30'. The display 10B is constituted by pixels 12. Each of the pixels 12 is provided with a memory 13 and a pixel circuit 14, as illustrated in an enlarged view of main parts in FIG. 5.

Via the signal voltage writing circuit 30', the lighting controller 50 causes the pixel circuits 14 included in the pixels 12 to simultaneously perform the lighting control of the light emitting elements 11, in a state in which the gradation information corresponding to the one image, of each of the light emitting elements 11 of the display 10B, is written into the memory 13 in the pixel. In other words, whereas, in the example of the passive matrix driving method in FIG. 1 described above, the current driver 30 is provided with the memory that temporarily stores the drive current value for each of the light emitting elements 11, in the active matrix driving method, the memory 13 is provided for each of the pixels 12. Further, the pixel circuit 14 is provided with the light emitting element 11 and an active element 15. The active element 15 is a switch for switching between lighting and non-lighting of the pixel, and a transistor such as a TFT can be used. The signal voltage writing circuit 30' outputs a video signal voltage based on a control signal and image data supplied from the outside.

Figure 6:
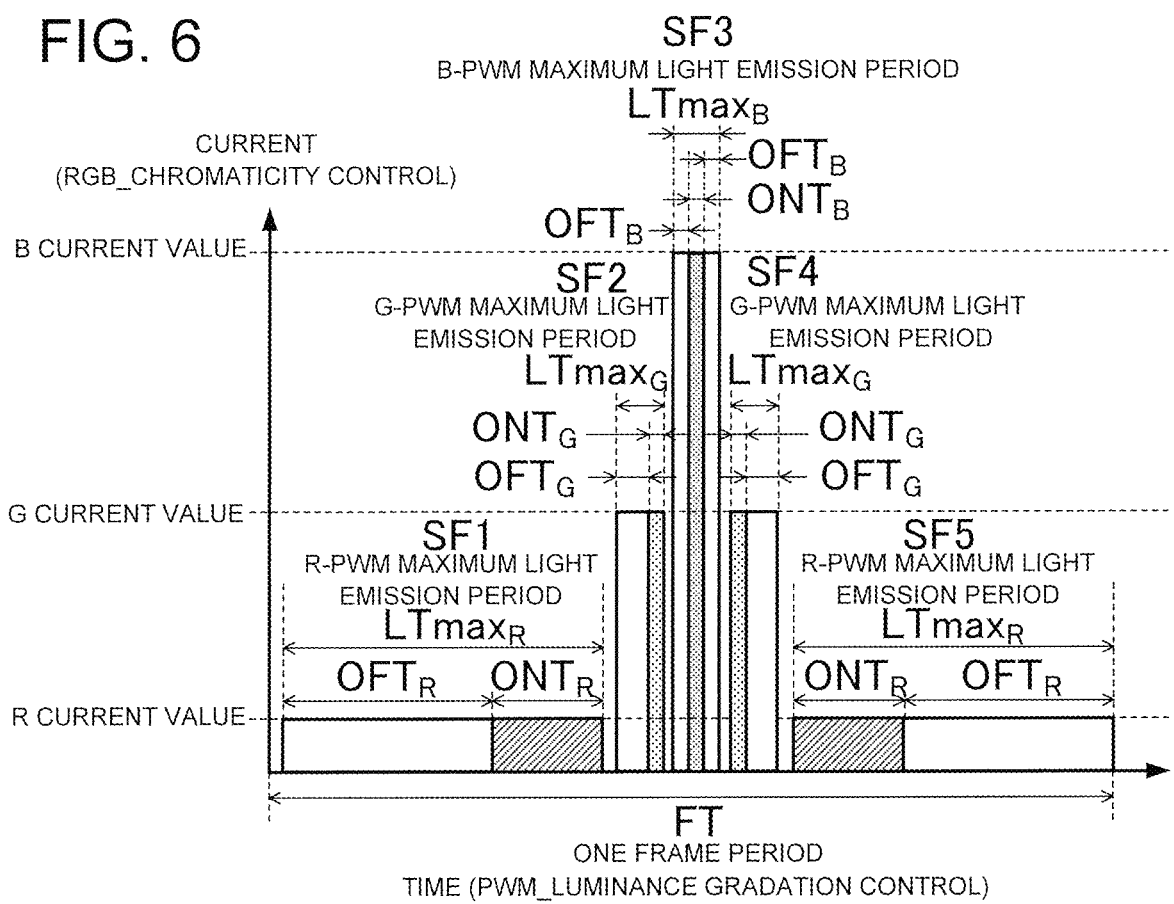
FIG. 6 is a timing chart showing lighting timings of each of RGB colors in one frame period of the light emitting device illustrated in FIG. 5.

Here, FIG. 6 is a timing chart showing lighting timings of each of the RGB colors in one frame period of the light emitting device 200 according to the second embodiment. As shown in this drawing, in the active matrix driving method, one frame is time-divided for each of the luminescent colors. The divided frames are referred to as sub-frames or fields. Further, in the active matrix driving method, the lighting controller 50 first writes the gradation data to all of the pixels 12 using the scanner 20 and the signal voltage writing circuit 30'. The lighting controller 50 controls a data writing timing of the scanner 20. Next, each of the pixel circuits 14 performs PWM control on the light emitting element 11 of each of the pixels 12 in accordance with the written gradation information. The lighting controller 50 controls a timing of the scanner 20. At this time, the entire screen is globally controlled by a current value corresponding to the emission color. Such writing and PWM control are repeated for the number of sub-frames within one frame period FT, to display a full-color image on the display 10B.

Note that one image of a moving image is one frame, and the sub-frame is vertical scanning forming the one image. For example, in general NTSC, one second of the moving image is composed of 30 frames and 60 sub-frames. In this case, one frame is composed of two sub-frame scans. On the other hand, in the light emitting device 200 according to the second embodiment, one frame is composed of five sub-frames.

Here, the timing is set so that the ON period of the short wavelength requiring the large current is in the vicinity of a central timing in one frame. On the other hand, the ON period of the longer wavelength requiring the small current is set to a timing before or after the ON period of the large current. This is to avoid the color separation when displaying the moving image by aligning the temporal centers of gravity of the ON periods of the respective colors. This state is shown in the timing chart in FIG. 6.

FIG. 6 shows the lighting timings for causing the light emitting element 11 in the one frame period FT to emit the light of each of the RGB colors, in the light emitting device 200 illustrated in FIG. 5. Here, the one frame period FT is divided into the five sub-frames, that is, divided into a first sub-frame SF1, a second sub-frame SF2, a third sub-frame SF3, a fourth sub-frame SF4, and a fifth sub-frame SF5, and the light emitting elements 11 are caused to emit the red light in the first sub-frame SF1 and the fifth sub-frame SF5, to emit the green light in the second sub-frame SF2 and the fourth sub-frame SF4, and to emit the blue light in the third sub-frame SF3. Each of the sub-frames constitutes the maximum light emission period LTmax, and the gradation is expressed by changing the ON period ONT or the OFF period OFT within the maximum light emission period LTmax by the PWM control, as in FIG. 2 and the like described above. However, unlike FIG. 2 and the like, the light emission of R, G, and B is not repeated in order, and, in FIG. 6, the shortest maximum light emission period LTmax among the maximum light emission periods LTmax of R, G, and B is set as the center, and the remaining maximum light emission periods LTmax are respectively divided into two periods and rearranged such that the shorter thereof is on the center side. Here, the blue light PWM maximum light emission period $LTmax_B$ having the relatively shortest maximum light emission period LTmax is positioned at the center, and the green light PWM maximum light emission period $LTmax_G$ having the second shortest maximum light emission period LTmax is divided into the two periods, which are positioned before and after the blue light PWM maximum light emission period $LTmax_B$. Finally, the red light PWM maximum light emission period $LTmax_R$ having the longest maximum light emission period LTmax is divided into the two periods, which are positioned before and after the respective green light PWM maximum light emission periods $LTmax_G$. As a result, as described above, the first sub-frame SF1 and the fifth sub-frame SF5 become the red light PWM maximum light emission periods $LTmax_R$, the second sub-frame SF2 and the fourth sub-frame SF4 become the green light PWM maximum light emission periods $LTmax_G$, and the third sub-frame SF3 becomes the blue light PWM maximum light emission period $LTmax_B$. Further, the one frame is constituted by the first sub-frame SF1, the second sub-frame SF2, the third sub-frame SF3, the fourth sub-frame SF4, and the fifth sub-frame SF5.

Furthermore, in the maximum light emission period LTmax, where the ON period ONT and the OFF period OFT are all in the order of the ON period ONT→the OFF period OFT in the example of the passive matrix driving method of FIG. 2, in the active matrix driving method, the order is different depending on the maximum light emission period LTmax. In other words, for the shortest maximum light emission period LTmax positioned at the center, the ON period ONT is controlled to be positioned at the center of the maximum light emission period LTmax. As a result, the OFF period OFT is divided into two periods, which are arranged before and after the ON period ONT. In the example in FIG. 6, in the third sub-frame SF3, the blue light PWM maximum light emission period $LTmax_B$ is arranged in the order of a blue light OFF period $OFT_B$→a blue light ON period $ONT_B$→the blue light OFF period $OFT_B$.

Further, the green light PWM maximum light emission period $LTmax_G$ having the second shortest maximum light emission period LTmax is divided into the two periods, which are arranged before and after the shortest blue light PWM maximum light emission period $LTmax_B$ as described above, and the green light PWM maximum light emission period $LTmax_G$ arranged before the blue light PWM maximum light emission period $LTmax_B$ has the order of the OFF period OFT→the ON period ONT, while the green light PWM maximum light emission period $LTmax_G$ arranged after the blue light PWM maximum light emission period $LTmax_B$ has the order of the ON period ONT→the OFF period OFT. In the example in FIG. 6, in the second sub-frame SF2 arranged before the third sub-frame SF3 that is the shortest blue light PWM maximum light emission period $LTmax_B$, the green light PWM maximum light emission period $LTmax_G$ is arranged in the order of a green light OFF period $OFT_G$→a green light ON period $ONT_G$. Further, in the fourth sub-frame SF4 arranged after the third sub-frame SF3, the green light PWM maximum light emission period $LTmax_G$ is arranged in the order of the green light ON period $ONT_G$→the green light OFF period $OFT_G$. With such an arrangement, the ON period ONT is concentrated in a relatively short period, and thus the perception of the color separation phenomenon is alleviated for the human eye.

Furthermore, the longest red light PWM maximum light emission period $LTmax_R$ is also divided into the two periods arranged before the second sub-frame SF2 and after the fourth sub-frame SF4, which are the second shortest green light PWM maximum light emission periods $LTmax_G$ as described above, and similarly, the OFF period OFT and the ON period ONT are arranged in the order of the OFF period OFT→the ON period ONT for the red light PWM maximum light emission period $LTmax_R$ arranged in front, and the order of the ON period ONT→the OFF period OFT for the red light PWM maximum light emission period $LTmax_R$ arranged after. In the example in FIG. 6, in the first sub-frame SF1 arranged before the second sub-frame SF2 that is the second shortest green light PWM maximum light emission period $LTmax_G$, the red light PWM maximum light emission period $LTmax_R$ is arranged in the order of a red light OFF period $OFT_R$→a red light ON period $ONT_R$. Further, in the fifth sub-frame SF5 arranged after the sub-frame SF4, the red light PWM maximum light emission period $LTmax_R$ is arranged in the order of the red light ON period $ONT_R$→the red light OFF period $OFT_R$. With such an arrangement, the ON periods ONT are similarly concentrated within a relatively short time interval, so that the effect of alleviating the color separation phenomenon observed particularly in the display of the moving image can be expected.

As described above, in the example shown in FIG. 6, the one frame period FT is divided into the five sub-frames, and the same light emitting element 11 emits light in the order of R→G→B→G→R. This makes it possible to realize full-color light emission using the single light emitting element 11 while suppressing the color separation. In particular, by causing the light emission of G and R before and after B, whose maximum light emission period is short, the temporal centers of gravity of the ON periods ONT are brought close to the center, and the color separation is suppressed.

Although the driving method in which the one frame is divided into the five sub-frames is described above, it is also possible to further simplify the driving method in one frame by selecting a driving method in which one of the first and second sub-frames is omitted, or one of the second and fourth sub-frames is omitted, in applications in which specifications for color separation are more relaxed. In addition, although the timings of the maximum light emission period LTmax are caused to be the same over the pixels of the entire screen in the above-described embodiment, as an application example of the driving method, it is also possible to synchronize the writing timing of the gradation data and the light emission timing of the maximum light emission period LTmax of each of the pixels 12 for each row. In this case, in a similar manner to general active matrix driving, the maximum light emission period LTmax starts in order from the pixels 12 in the row in which the writing of the gradation data is complete, and each of the pixels 12 performs light emission driving of a predetermined color and luminance using the predetermined current value and the ON period ONT. In this way, there is no need to stand by to perform the lighting until the writing of gradation data to the pixels 12 of the entire screen is complete, and thus the maximum light emission period in one frame can be made longer, which is advantageous for high luminance.

In the examples described above, the light emitting device is described that expresses the various emission colors by emitting light in the wavelength regions of red (R), green (G), and blue (B) in the time-division manner using the single light emitting element 11. However, the present invention is not limited to the configuration in which the emission color of the light emitting element 11 is changed over the entire range of RGB, and may be limited to a specific emission color. For example, the emission colors R and G may be controlled and the light emitting device may not include the emission color B, or the emission colors G and B may be controlled and the light emitting device may not include the emission color R. By performing the lighting control in which the number of colors is limited as described above, it is possible to obtain an advantage in that the number of sub-frames can be reduced and the effect of suppressing the color separation can be improved. Such a light emitting device can be used for applications that do not require full-color display, such as indicators and signage.

Third Embodiment

Figure 7:
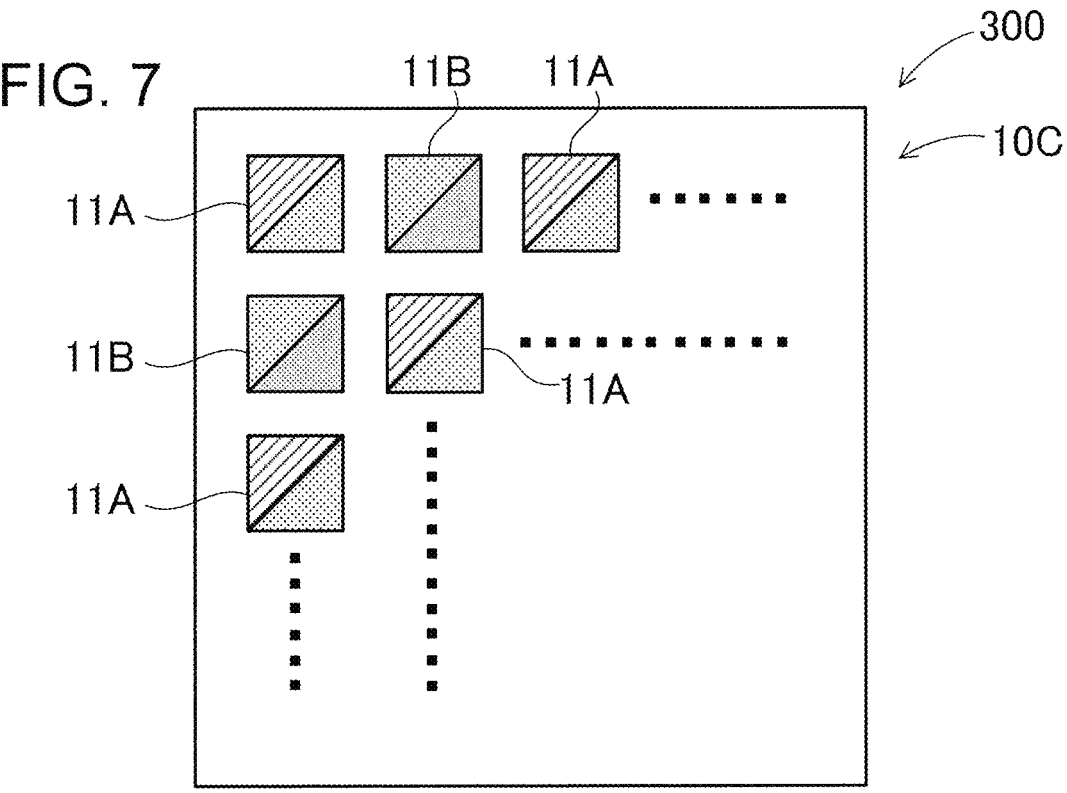
FIG. 7 is a schematic diagram illustrating a display of a light emitting device according to a third embodiment.
Figure 8C:
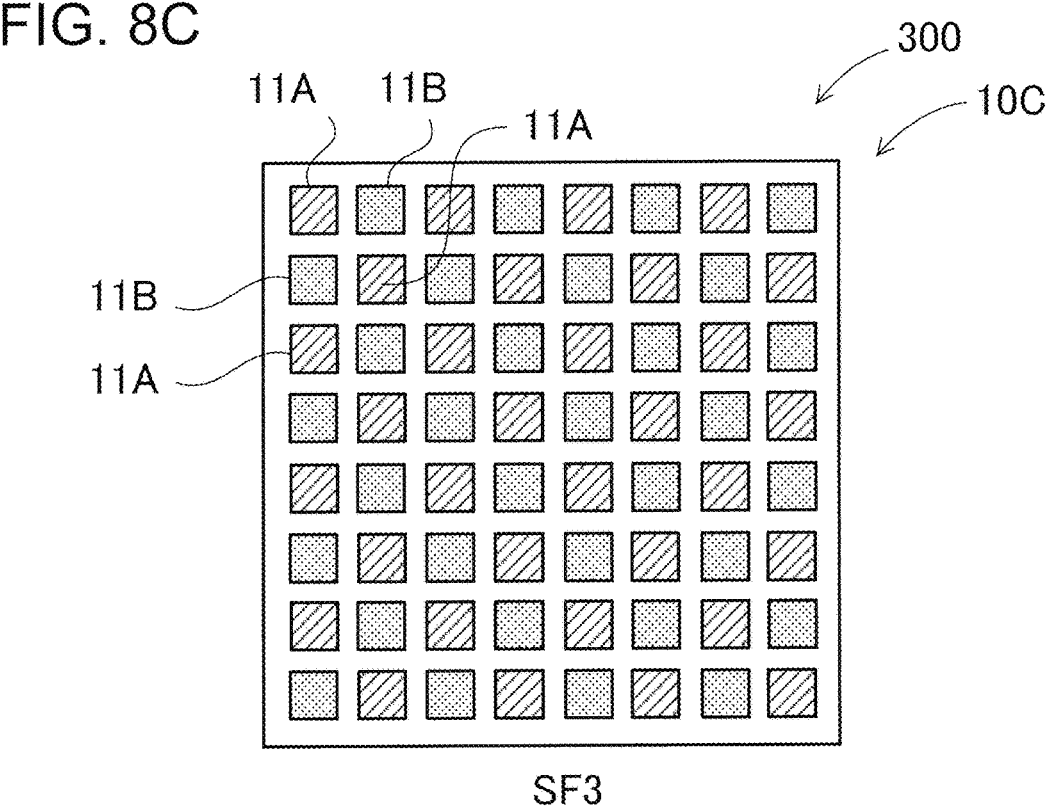
FIG. 8C is a schematic diagram illustrating a light emission pattern in a third sub-frame of the display illustrated in FIG. 7.

In the above-described examples, the light emitting device that emits light in multiple colors such as the three colors of RGB or the two colors of RG, GB, and RB using the one type of light emitting element is described. However, the present invention is not limited to a configuration in which the one type of light emitting element is used, and the light emitting device may be configured by combining different light emitting elements. For example, as the plurality of types of light emitting element, a first light emitting element capable of emitting light of different emission colors in accordance with the drive current, and a second light emitting element capable of emitting light of a different emission color from the first light emitting element in response to the same drive current may be used. In this case, the first light emitting element may emit light in the color range of R to G, and the second light emitting element may emit light in the color range of G to B. Such an example is illustrated in FIGS. 7 and 8A to 8C as a light emitting device 300 according to a third embodiment. In these drawings, FIG. 7 is a schematic diagram illustrating a display 10C of the light emitting device 300 according to the third embodiment, FIG. 8A is a schematic diagram illustrating a light emission pattern in the first sub-frame SF1 of the display 10C illustrated in FIG. 7, FIG. 8B is a schematic diagram illustrating a light emission pattern in the second sub-frame SF2, and FIG. 8C is a schematic diagram illustrating a light emission pattern in the third sub-frame SF3.

In the light emitting device 300 according to the third embodiment, first light emitting elements 11A and second light emitting elements 11B are alternately arranged in the display 10C in a staggered manner so as not to be adjacent to each other in the vertical or horizontal directions. The first light emitting element 11A emits light of the first wavelength when driven by the first drive current, and emits light of the second wavelength, which is shorter than the first wavelength, when driven by the second drive current larger than the first drive current. On the other hand, the second light emitting element 11B emits light of a third wavelength when driven by a third drive current, and emits light of a fourth wavelength that is shorter than the third wavelength when driven by a fourth drive current larger than the third drive current. In the example of the present embodiment, the light of the second wavelength and the light of the third wavelength are light having substantially the same wavelength. In the example illustrated in FIGS. 7, and 8A to 8C, the light of the first wavelength is red and the light of the second wavelength is green. The light of the third wavelength is green, and the light of the fourth wavelength is blue.

Further, the first light emitting elements 11A and the second light emitting elements 11B emit light of different emission colors for each of the sub-frames of the one frame. For example, when the one frame is divided into the first sub-frame and the second sub-frame, the first light emitting element 11A emits light of the first wavelength in the first sub-frame and emits light of the second wavelength in the second sub-frame. On the other hand, the second light emitting element 11B emits light of the third wavelength in the first sub-frame, and emits light of the fourth wavelength in the second sub-frame.

In the light emitting device 300 according to the third embodiment, the one frame includes three of the sub-frames. In the example illustrated in FIGS. 8A to 8C, the first sub-frame SF1 to the third sub-frame SF3 obtained by dividing the one frame period FT of the moving image into the three sub-frames are illustrated. In the first sub-frame SF1, as illustrated in FIG. 8A, the first light emitting elements 11A emit red light, which is the light of the first wavelength, and the second light emitting elements 11B emit green light, which is the light of the third wavelength. On the other hand, in the second sub-frame SF2, as illustrated in FIG. 8B, the first light emitting elements 11A emit green light, which is the light of the second wavelength, and the second light emitting elements 11B emit blue light, which is the light of the fourth wavelength. Further, in the third sub-frame SF3, as illustrated in FIG. 8C, the first light emitting elements 11A emit red light, which is the light of the first wavelength, and the second light emitting elements 11B emit green light, which is the light of the third wavelength. In other words, the third sub-frame SF3 has the same light emission pattern as the first sub-frame SF1.

Figure 9A:
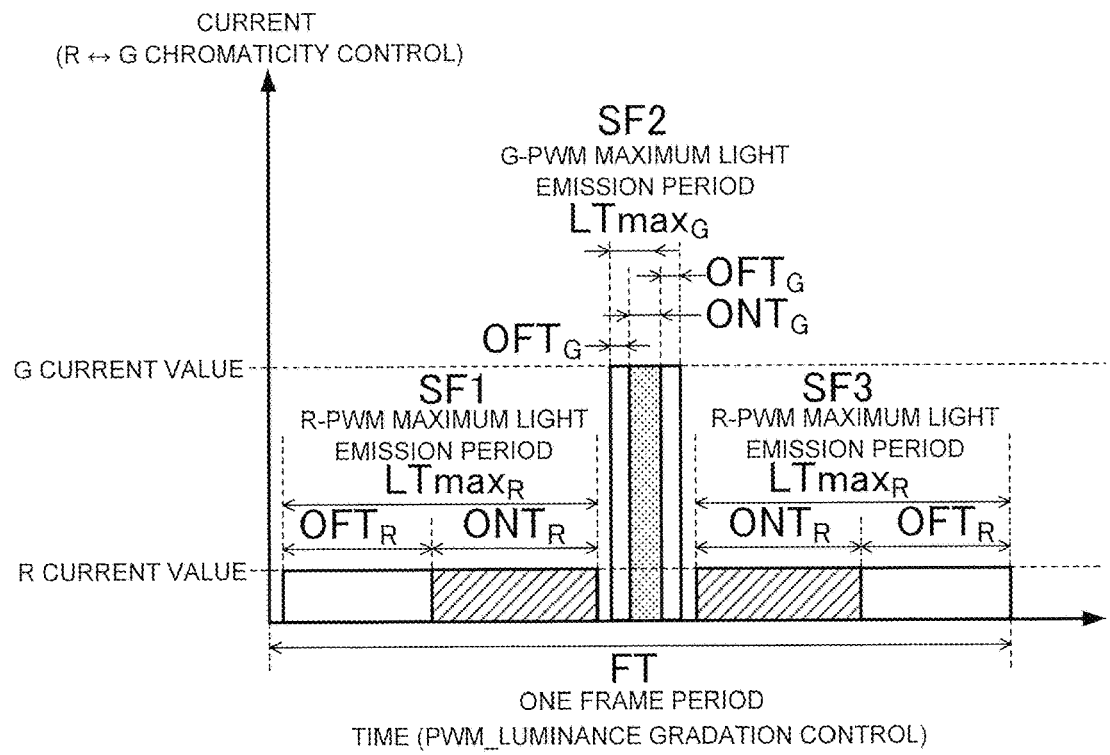
FIG. 9A is a timing chart showing lighting timings of a first light emitting element of the display illustrated in FIG. 7.
Figure 9B:
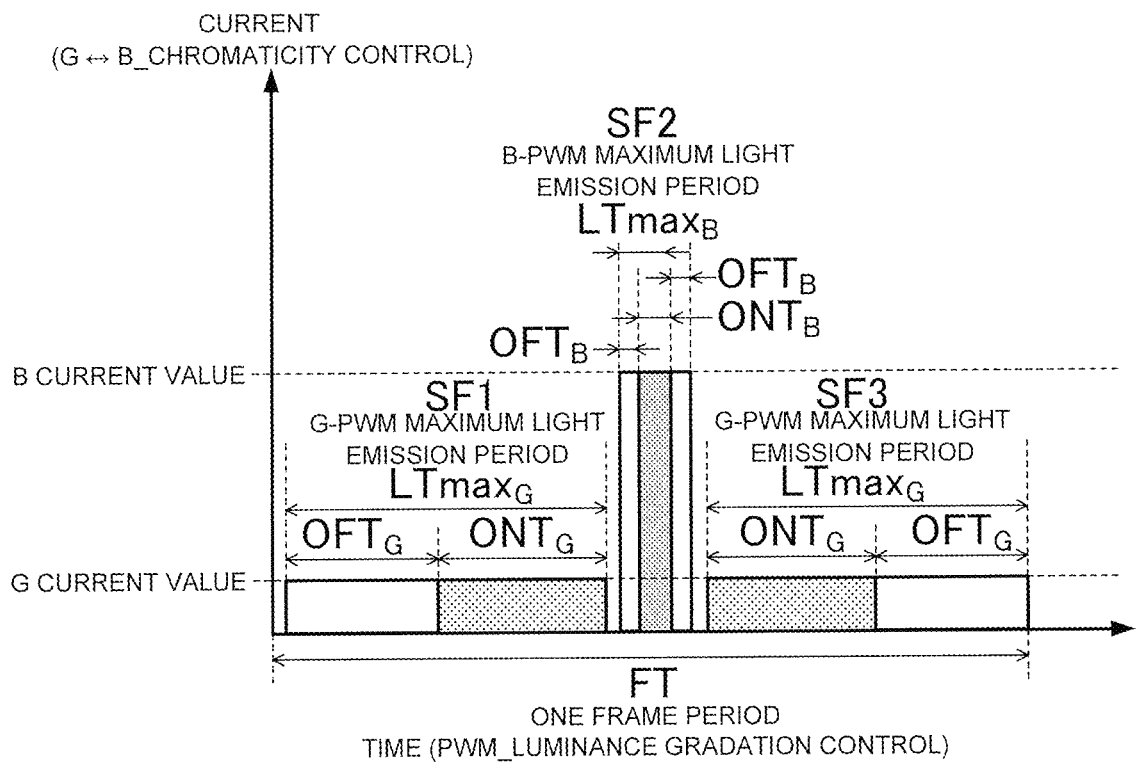
FIG. 9B is a timing chart showing lighting timings of a second light emitting element of the display illustrated in FIG. 7.

Further, timings of the lighting control when the active matrix driving method is adopted as the specific lighting control are shown in timing charts in FIGS. 9A and 9B. In these drawings, FIG. 9A shows the timings of the lighting control of the first light emitting elements 11A of the display 10C illustrated in FIG. 7, and FIG. 9B shows the timings of the lighting control of the second light emitting elements 11B, respectively. In FIGS. 9A and 9B, the PWM control is performed in each of the first sub-frame SF1, the second sub-frame SF2, and the third sub-frame SF3 of the one frame period FT of the moving image. Each of the frames is scanned in the order of the first sub-frame SF1 of FIG. 8A, the second sub-frame SF2 of FIG. 8B, and the third sub-frame SF3 of FIG. 8C. Here, the first sub-frame SF1 of FIG. 8A indicates long time period small current, the second sub-frame SF2 of FIG. 8B indicates short time period large current, and the third sub-frame SF3 of FIG. 8C indicates long time period small current.

Further, when the PWM control is performed, it is preferable to control the ON periods to be close to each other so that the lighting periods, that is, the ON periods, are temporally continuous between the adjacent sub-frames. For example, when the one frame is divided into the first sub-frame and the second sub-frame, in the first sub-frame, the OFF period is arranged to be temporally first and the ON period is arranged to be temporally last. On the other hand, in the second sub-frame, the ON period is arranged to be temporally first and the OFF period is arranged to be temporally last. As shown in FIGS. 9A and 9B, when the one frame is divided into the three sub-frames, i.e., the first sub-frame SF1, the second sub-frame SF2, and the third sub-frame SF3, in the first sub-frame SF1, the OFF period is arranged to be temporally first and the ON period is arranged to be temporally last. Further, in the third sub-frame SF3, in reverse to this, the ON period is arranged to be temporally first and the OFF period is arranged to be temporally last. On the other hand, in the second sub-frame SF2, the ON period is arranged to be temporally in the center. By performing the lighting control so that the ON period is continuous between the adjacent sub-frames in this manner, the temporal centers of gravity of the ON periods are brought close to the center, and the effect of suppressing the occurrence of the color separation can be obtained.

Specifically, the first light emitting elements 11A shown in FIG. 9A emit light of the two colors of the first and second wavelengths in the time-division manner. Here, red light is emitted in the first sub-frame SF1, green light is emitted in the second sub-frame SF2, and red light is emitted in the third sub-frame SF3, respectively. Each of the sub-frames constitutes the maximum light emission period LTmax in the same manner as described above, and the gradation is expressed by changing the ON period ONT or the OFF period OFT within the maximum light emission period LTmax by the PWM control. Further, in a similar manner to FIG. 6, of the first wavelength and the second wavelength, the one having the shorter maximum light emission period LTmax is set at the center, and the other maximum light emission period LTmax is divided into two periods, which are arranged before and after. Here, the green light PWM maximum light emission period $LTmax_G$ is positioned in the center second sub-frame SF2, and the red light PWM maximum light emission period $LTmax_R$ is positioned in each of the first sub-frame SF1 and the third sub-frame SF3 before and after the second sub-frame SF2. As a result, the first light emitting elements 11A emit light in the order of red→green→red.

In a similar manner to FIG. 6, in FIG. 9A also, for the maximum light emission period LTmax positioned at the center, the ON period ONT is positioned at the center and the OFF period OFT is divided into two periods, which are arranged before and after the ON period ONT. In the example in FIG. 9A, in the second sub-frame SF2, the green light PWM maximum light emission period $LTmax_G$ is arranged in the order of the green light OFF period $OFT_G$→the green light ON period $ONT_G$→the green light OFF period $OFT_G$.

Further, of the maximum light emission periods LTmax positioned before and after, the maximum light emission period LTmax positioned before is set in the order of the OFF period OFT→the ON period ONT, and the maximum light emission period LTmax positioned after is set in the order of the ON period ONT→the OFF period OFT. In the example in FIG. 9A, in the first sub-frame SF1 arranged before the green light PWM maximum light emission period $LTmax_G$ that is the second sub-frame SF2, the red light PWM maximum light emission period $LTmax_R$ is arranged in the order of the red light OFF period $OFT_R$→the red light ON period $ONT_R$. Further, in the third sub-frame SF3 arranged after the second sub-frame SF2, the red light PWM maximum light emission period $LTmax_R$ is arranged in the order of the red light ON period $ONT_R$→the red light OFF period $OFT_R$. As described above, even in the example in which the emission color is changed between the two colors, the color separation phenomenon can be alleviated by arranging the sub-frames, the ON periods, and the OFF periods so that the ON periods ONT are continuous.

In a similar manner, the second light emitting elements 11B illustrated in FIG. 9B emit light of the two colors of the third and fourth wavelengths. To be more specific, green light is emitted in the first sub-frame SF1, blue light is emitted in the second sub-frame SF2, and green light is emitted in the third sub-frame SF3, respectively. The shortest maximum light emission period LTmax is positioned at the center, and the other maximum light emission period LTmax is divided into two periods, which are arranged before and after. Here, the blue light PWM maximum light emission period $LTmax_B$ is positioned in the center second sub-frame SF2, and the green light PWM maximum light emission period $LTmax_G$ is positioned in each of the first sub-frame SF1 and the third sub-frame SF3 before and after the second sub-frame SF2. As a result, the second light emitting elements 11B emit light in the order of green→blue→green. For the maximum light emission period LTmax positioned at the center, the ON period ONT is positioned at the center and the OFF period OFT is divided into two periods, which are arranged before and after the ON period ONT. In the example in FIG. 9B, in the second sub-frame SF2, the blue light PWM maximum light emission period $LTmax_B$ is arranged in the order of the blue light OFF period $OFT_B$→the blue light ON period $ONT_B$→the blue light OFF period $OFT_B$. Furthermore, of the maximum light emission periods LTmax positioned before and after, the maximum light emission period LTmax positioned before is set in the order of the OFF period OFT→the ON period ONT, and the maximum light emission period LTmax positioned after is set in the order of the ON period ONT→the OFF period OFT. In the example in FIG. 9B, in the first sub-frame SF1 arranged before the blue light PWM maximum light emission period $LTmax_B$ that is the second sub-frame SF2, the green light PWM maximum light emission period $LTmax_G$ is arranged in the order of the green light OFF period $OFT_G$→the green light ON period $ONT_G$. Further, in the third sub-frame SF3 arranged after the second sub-frame SF2, the green light PWM maximum light emission period $LTmax_G$ is arranged in the order of the green light ON period $ONT_G$→the green light OFF period $OFT_G$. In this way, in a similar manner to FIG. 9A, the color separation phenomenon can be alleviated by arranging the sub-frames, the ON periods, and the OFF periods so that the ON periods ONT are continuous.

As described above, by causing the first light emitting elements 11A and the second light emitting elements 11B to respectively emit light of different emission colors in the first sub-frame SF1 to the third sub-frame SF3, the emission colors of the respective sub-frames when perceived by the human eye, and, as a result of further temporally continuing the different sub-frames, a desired color is observed due to a residual image effect. Specifically, mixed color light obtained by the red light of the first light emitting elements 11A and the green light of the second light emitting elements 11B is expressed in the first sub-frame SF1 and the third sub-frame SF3, and mixed color light obtained by the green light of the first light emitting elements 11A and the blue light of the second light emitting elements 11B is expressed in the second sub-frame SF2. These mixed color lights are observed over the entire one frame period FT. According to the above-described configuration, the first light emitting elements 11A can emit light in the color range of R to G, and the second light emitting elements 11B can emit light in the color range of G to B. Since both the first light emitting elements 11A and the second light emitting elements 11B can emit green light in this manner, all the pixels can emit green light, which is considered to have high visibility and high resolution for the human eye, and the light emitting device having excellent visibility and resolution can thus be obtained.

In the third embodiment, both the first light emitting elements 11A and the second light emitting elements 11B emit light of the same color in the first frame and the third frame, and emit light of a different color in the second frame. With such a configuration, total luminance can be secured by causing the period (in this example, the first sub-frame SF1 and the third sub-frame SF3) in which the emission color with the small drive current is emitted to be longer than the period (in this example, the second sub-frame SF2) in which the emission color with the large drive current is emitted. Further, by performing the lighting control such that the sub-frames (in this example, the first sub-frame SF1 and the third sub-frame SF3) in which light is emitted for a long period are temporally arranged on either side of the sub-frame (in this example, the second sub-frame SF2) in which light is emitted for a short period, it is possible to obtain effects of reducing the number of sub-frames and suppressing the occurrence of color separation. In particular, in the examples shown in FIGS. 9A and 9B, when the PWM control is performed, the occurrence of color separation can be further suppressed by adjusting the order of the ON/OFF periods and the positions of the ON periods so that the ON periods are continuous, as described above. Further, an advantage of simplifying the drive control is also achieved. In addition, since a variable range of the wavelengths of a semiconductor chip constituting the light emitting element 11 can be limited to approximately 447 nm to 552 nm, or 512 nm to 650 nm (corresponding to two colors), rather than to approximately 447 nm to 650 nm (corresponding to three colors), it is also possible to obtain an effect of improving yield by reducing a degree of difficulty at a time of crystal growth.

Note that, although the driving method in which the one frame is divided into the three sub-frames is described above, it is apparent that the driving method in the one frame can be further simplified by selecting a driving method in which one of the first and third sub-frames is omitted in applications in which the specifications for color separation are more relaxed.

Fourth Embodiment

In the third embodiment described above, an example is described in which the light emitting device is constituted by the two types of the single light emitting element capable of emitting light of different emission colors. However, in the present invention, a light emitting device can also be constituted by a combination of single light emitting elements capable of emitting light of different emission colors, and light emitting elements capable of emitting light of only one emission color. Such an example is illustrated in FIGS. 10A to 11B as a light emitting device 400 according to a fourth embodiment. In these drawings also, the same members as those of the light emitting devices according to each of the above-described embodiments are denoted by the same reference signs, and a detailed description thereof is omitted.

Figure 10A:
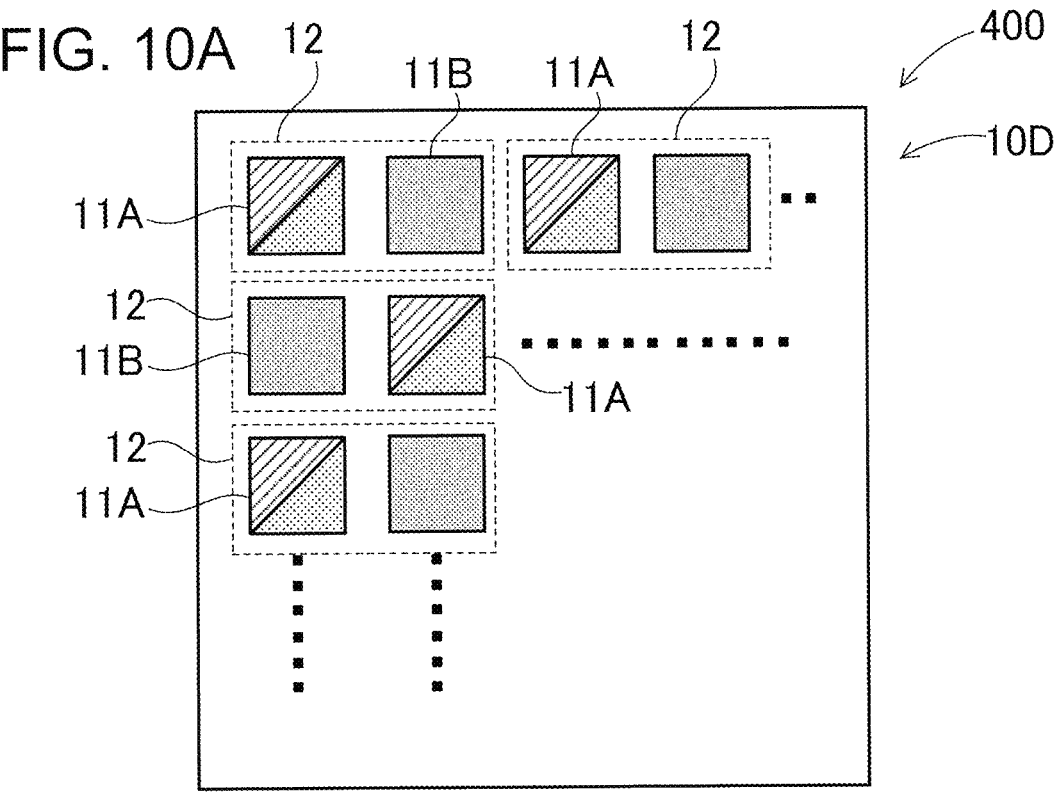
FIG. 10A is a schematic diagram illustrating a display of a light emitting device according to a fourth embodiment.

In the light emitting device 400 illustrated in FIG. 10A, a display 10D is formed by arranging the first light emitting elements 11A and the second light emitting elements 11B in the staggered manner. When driven by the first drive current, the first light emitting element 11A emits light of the first wavelength, and when driven by the second drive current, the first light emitting element 11A emits light of the second wavelength. On the other hand, the second light emitting element 11B emits light of the third wavelength regardless of the magnitude of the drive current. Each of the pixels 12 is constituted by at least one of the first light emitting elements 11A and at least one of the second light emitting elements 11B.

Figure 11A:
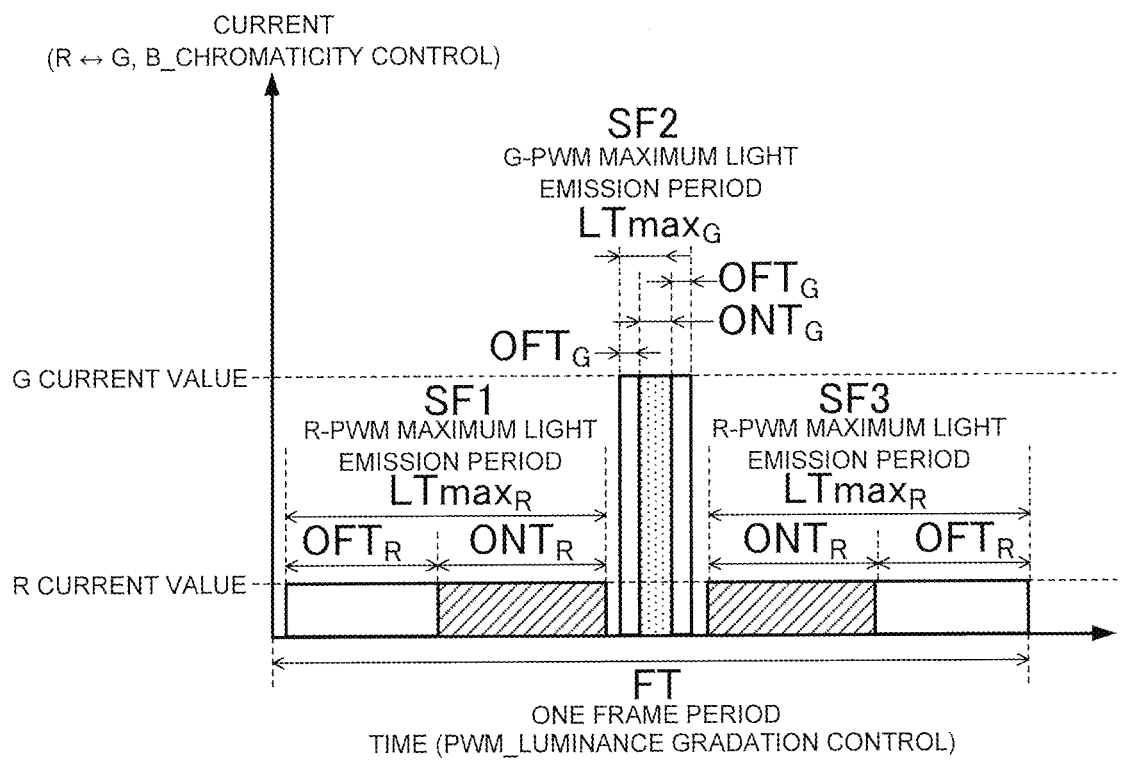
FIG. 11A is a timing chart showing lighting timings of a first light emitting element of the display illustrated in FIG. 10A.
Figure 11B:
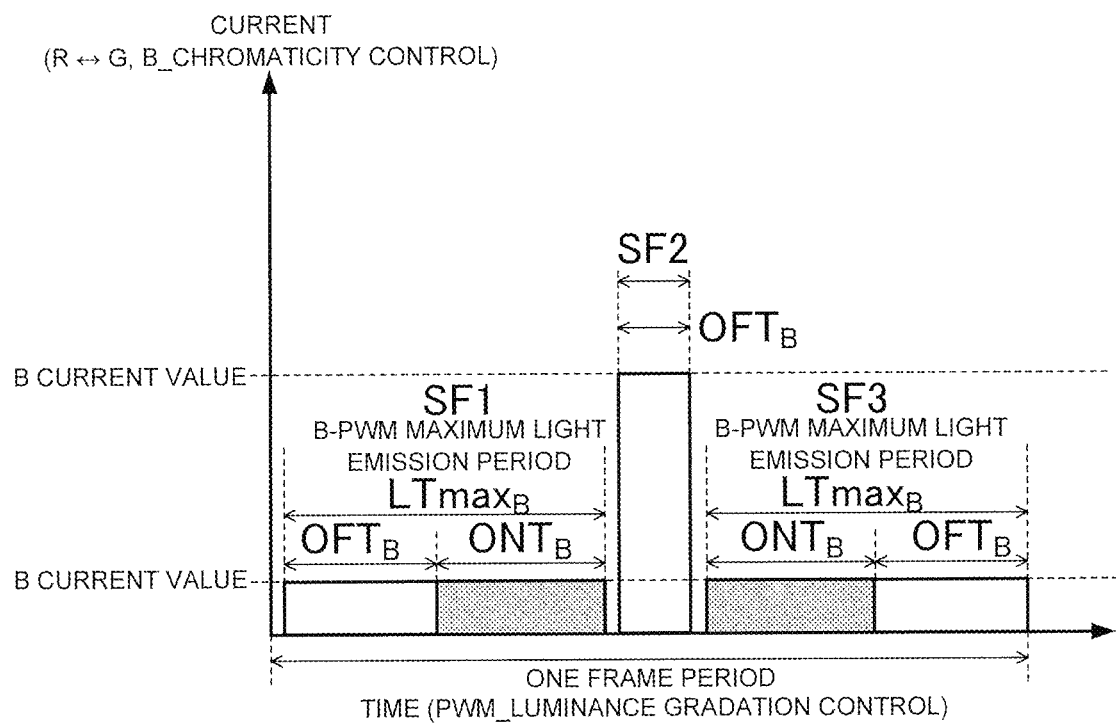
FIG. 11B is a timing chart showing lighting timings of a second light emitting element of the display illustrated in FIG. 10A.

The third wavelength may be shorter than the first wavelength. Further, the third wavelength may be shorter than the second wavelength. For example, when the light of the third wavelength is blue as illustrated in FIG. 10A, the light of the first wavelength can be red and the light of the second wavelength can be green. In this case, the light emission pattern of the display 10D in the first sub-frame SF1 and the third sub-frame SF3 is as illustrated in FIG. 10B. The light emission pattern in the second sub-frame SF2 is as illustrated in FIG. 10C. Furthermore, the lighting driving control of the first light emitting elements 11A and the second light emitting elements 11B is as illustrated in FIGS. 11A and 11B, respectively. That is, in the first sub-frame SF1, the lighting control is performed on the first light emitting elements 11A and the second light emitting elements 11B as illustrated in FIG. 10B, and in the second sub-frame, the lighting control is performed on only the first light emitting elements 11A as illustrated in FIG. 10C. In other words, the second light emitting elements 11B are not lit in the second sub-frame SF2 (in the example in FIG. 10C, the second light emitting elements 11B are white squares outlined in black in order to indicate that the second light emitting elements 11B are in an off state). As described above, in the examples according to the present embodiment, the lighting driving control is adopted in which the ON periods of the second light emitting elements 11B, whose wavelengths do not depend on the drive current, are the first sub-frame SF1 and the third sub-frame SF3, and the second light emitting elements 11B are turned off in the second sub-frame SF2.

Further, in the first sub-frame SF1, the first light emitting elements 11A emit light of the first wavelength, i.e., red light, and the second light emitting elements 11B emit light of the third wavelength, i.e., blue light, in the time-division manner, respectively. Here, the is performed by the PWM control.

On the other hand, in the second sub-frame SF2, only the first light emitting elements 11A emit light and the second light emitting elements 11B are turned off. In this case, the first light emitting elements 11A emit light of the second wavelength, i.e., green light, under the PWM control.

Furthermore, in the third sub-frame SF3, as in the first sub-frame SF1, the first light emitting elements 11A are caused to emit light of the first wavelength, i.e., red light, and the second light emitting elements 11B are caused to emit light of the third wavelength, i.e., blue light, in the time-division manner, respectively. However, the PWM control first causes the first light emitting elements 11A and the second light emitting elements 11B to emit light, and subsequently turns off the light. As described above, the lighting control is performed such that the light is emitted in the order of the first sub-frame SF1 driven by the low current, the second sub-frame SF2 driven by the high current, and the third sub-frame SF3 driven by the low current, and the second sub-frame SF2 driven by the high current is interposed between the first sub-frame SF1 driven by the low current and the third sub-frame SF3 driven by the low current, thus suppressing the color separation. In addition, at the time of the PWM, the ON period and the OFF period are adjusted so that the ON period is continuous, as much as possible, between the consecutive sub-frames. Here, in the first sub-frame SF1, the OFF period is followed by the ON period. Further, in the second sub-frame SF2, the ON period is interposed between the OFF periods before and after the ON period, and the ON period is positioned at the temporal center. Further, in the third sub-frame SF3, the ON period is followed by the OFF period. In this way, since the ON periods are adjacent to each other even across the sub-frames, the color separation is suppressed. The effect of suppressing the color separation can also be obtained by turning on the light of the first wavelength and the light of the third wavelength in the temporally symmetrical manner in the first sub-frame SF1 and the third sub-frame SF3. This is because the temporal centers of the respective colors are aligned.

Specifically, the first light emitting element 11A shown in FIG. 11A emits the two colors of red light, which is the first wavelength, and green light, which is the second wavelength. Here, in a similar manner to the above-described FIG. 9A, the red light is emitted in the first sub-frame SF1, the green light is emitted in the second sub-frame SF2, and the red light is emitted in the third sub-frame SF3, respectively. Each of the sub-frames constitutes the maximum light emission period LTmax, and the gradation is expressed by changing the ON period ONT or the OFF period OFT within the maximum light emission period LTmax by the PWM control. Further, in a similar manner, of the first wavelength and the second wavelength, the wavelength having the shorter maximum light emission period LTmax, which here is the green light PWM maximum light emission period $LTmax_G$, is positioned in the center second sub-frame SF2, and the other red light PWM maximum light emission period $LTmax_R$ is divided into the two periods, which are respectively positioned in the first sub-frame SF1 and the third sub-frame SF3 before and after the second sub-frame SF2. As a result, the first light emitting element 11A emits light in the order of red→green→red.

In a similar manner to FIGS. 6 and 9A, in FIG. 11A also, in the green light PWM maximum light emission period $LTmax_G$ positioned in the second sub-frame SF2 at the center, the ON period ONT is positioned at the center, and the OFF period OFT is divided into two periods, which are arranged before and after the ON period ONT. As a result, the green light PWM maximum light emission period $LTmax_G$ of the second sub-frame SF2 is arranged in the order of the green light OFF period $OFT_G$→the green light ON period $ONT_G$→the green light OFF period $OFT_G$.

Furthermore, of the maximum light emission periods LTmax positioned before and after, the maximum light emission period LTmax positioned before is set in the order of the OFF period OFT→the ON period ONT, and the maximum light emission period LTmax positioned after is set in the order of the ON period ONT→the OFF period OFT. In the example of FIG. 11A, in the first sub-frame SF1 arranged before the green light PWM maximum light emission period $LTmax_G$ that is the second sub-frame SF2, the red light PWM maximum light emission period $LTmax_R$ is arranged in the order of the red light OFF period $OFT_R$→the red light ON period $ONT_R$. Further, in the third sub-frame SF3 arranged after the second sub-frame SF2, the red light PWM maximum light emission period $LTmax_R$ is arranged in the order of the red light ON period $ONT_R$→the red light OFF period $OFT_R$. By arranging the sub-frames, the ON periods, and the OFF periods so that the ON periods ONT are temporally continuous in this way, the color separation phenomenon can be alleviated.

On the other hand, the second light emitting element 11B shown in FIG. 11B can emit only blue light, which is the third wavelength. In other words, the wavelength of the second light emitting element 11B is not dependent on the drive current. Here, the blue light is emitted in each of the first sub-frame SF1 and the third sub-frame SF3, while light is not emitted in the second sub-frame SF2, as the OFF period $OFT_B$. In other words, the maximum light emission period $LTmax_B$ is divided into two periods, which are arranged in the first sub-frame SF1 and the third sub-frame SF3. Note that, in the first sub-frame SF1 and the third sub-frame SF3, in a similar manner to the above, the blue light PWM maximum light emission period $LTmax_R$ in the preceding first sub-frame SF1 is in the order of the blue light OFF period $OFT_B$→the blue light ON period $ONT_B$, and the blue light PWM maximum light emission period $LTmax_B$ in the following third sub-frame SF3 is in the order of the blue light ON period $ONT_B$→the blue light OFF period $OFT_B$. By arranging the sub-frames, the ON periods, and the OFF periods so that the ON periods ONT are temporally continuous in this way, the color separation phenomenon can be alleviated.

Note that, in the above example, the lighting driving control is adopted in which the ON period of the second light emitting element 11B is included in the first sub-frame SF1 and the third sub-frame SF3, and the ON period is not included in the second sub-frame SF2. However, the present invention is not limited to this configuration, and the ON period of the second light emitting element may also be provided in the second sub-frame SF2, for example. In this case, the drive current value of the second light emitting element in FIG. 11B (a B current value in the first sub-frame SF1 and the third sub-frame SF3 indicated by the vertical axis) is reduced, and light is emitted in the second sub-frame SF2 by an amount corresponding to the reduction, thus obtaining an advantage that the life of the light emitting element can be extended. Alternatively, conversely, the ON period of the second light emitting element may be set only in the second sub-frame SF2, and light may not be emitted in the first sub-frame SF1 and the third sub-frame.

Although the example of the active matrix driving method is described in the example of the fourth embodiment above, it goes without saying that the passive matrix driving method can also be adopted.

Fifth Embodiment

Figure 12:
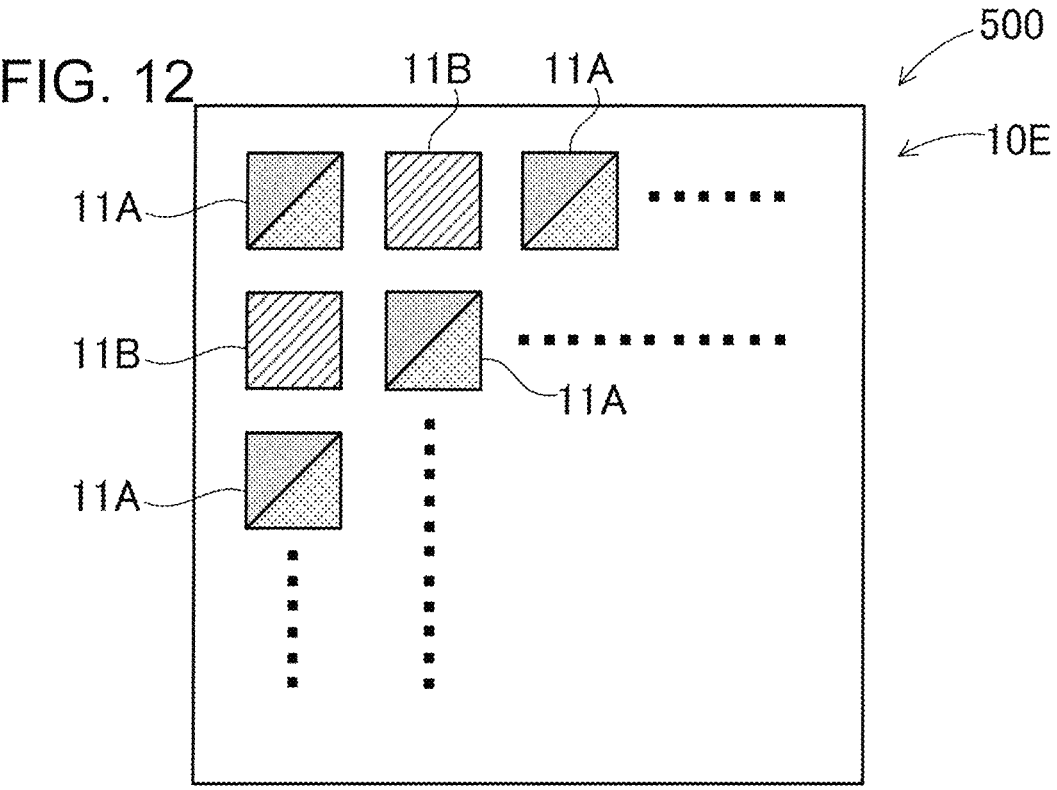
FIG. 12 is a schematic diagram illustrating a display of a light emitting device according to a fifth embodiment.

In the fourth embodiment described above, the example is described in which, in the light emitting device combining the light emitting elements capable of emitting light of different emission colors and the light emitting elements capable of emitting light of only one emission color, the third wavelength is shorter than the first wavelength or the second wavelength. However, the present invention is not limited to this configuration, and the third wavelength may be a longer wavelength than the first wavelength or the second wavelength. Such an example is illustrated in FIG. 12, as a light emitting device 500 according to a fifth embodiment. In this drawing also, the same members as those of the light emitting devices according to each of the above-described embodiments are denoted by the same reference signs, and a detailed description thereof is omitted.

In the light emitting device 500 illustrated in FIG. 12, a display 10E is formed by arranging the first light emitting elements 11A and the second light emitting elements 11B in the staggered manner, in a similar manner to FIGS. 10A to 10C. When driven by the first drive current, the first light emitting element 11A emits light of the first wavelength, and when driven by the second drive current, the first light emitting element 11A emits light of the second wavelength. On the other hand, the second light emitting element 11B emits light of the third wavelength regardless of the magnitude of the drive current. Here, the light of the third wavelength is red, the light of the first wavelength is green, and the light of the second wavelength is blue. The lighting driving control of the light emitting device 500 causes the first light emitting elements 11A to emit green light and the second light emitting elements 11B to emit red light in a time-division manner in the first sub-frame SF1. Further, in the second sub-frame SF2, only the first light emitting elements 11A emit blue light and the second light emitting elements 11B are turned off. Furthermore, in the third sub-frame SF3, the first light emitting elements 11A emit green light and the second light emitting elements 11B emit red light in a time-division manner. As a result, RGB can be expressed for each of the pixels in the frame constituted by the first sub-frame SF1 to the third sub-frame SF3.

In addition, in the light emitting element 11 capable of emitting light of different emission colors depending on the drive current, as described above, the longer the wavelength is, the smaller the drive current value is and the lower the luminance is. Thus, in order to compensate for this, it is necessary to increase the light emission period. Therefore, for the emission color having the long wavelength, by preparing the individual light emitting elements 11 that emit light only of that color, as illustrated in FIG. 12, sufficient luminance can be obtained even when the drive current value is increased and the light emission period is shortened, that is, even when the light is emitted in the first sub-frame SF1 and the third sub-frame in the same manner as the green light emission of the first light emitting elements.

Sixth Embodiment

Figure 13:
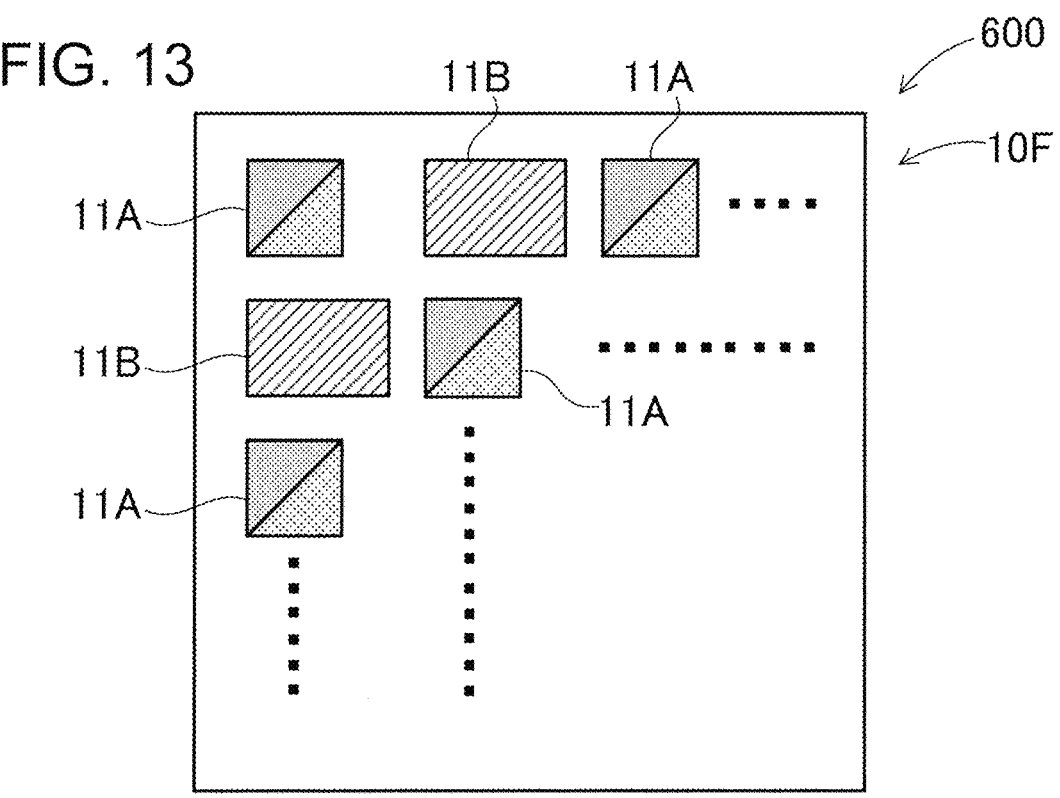
FIG. 13 is a schematic diagram illustrating a display of a light emitting device according to a sixth embodiment.

On the other hand, the luminance of light having the long wavelength can be secured by another method. For example, an area of a light emitting surface of the light emitting element 11 is increased. Such an example is illustrated in FIG. 13, as a light emitting device 600 according to a sixth embodiment. In this drawing also, the same members as those of the light emitting devices according to each of the above-described embodiments are denoted by the same reference signs, and a detailed description thereof is omitted.

In the light emitting device 600 illustrated in FIG. 13 also, a display 10F is formed by arranging the first light emitting elements 11A and the second light emitting elements 11B in the staggered manner, as in FIG. 12 and the like. When driven by the first drive current, the first light emitting element 11A emits light of the first wavelength, and when driven by the second drive current, the first light emitting element 11A emits light of the second wavelength. On the other hand, the second light emitting element 11B emits light of the third wavelength regardless of the magnitude of the drive current. Here, in a similar manner to FIG. 12, the light of the third wavelength is red, the light of the first wave-length is green, and the light of the second wavelength is blue. Further, the lighting driving control of the light emitting device 600 also causes the first light emitting elements 11A to emit green light and the second light emitting elements 11B to emit red light in a time-division manner in the first sub-frame SF1, in a similar manner to FIG. 12. Further, in the second sub-frame SF2, only the first light emitting elements 11A emit blue light and the second light emitting elements 11B are turned off. Furthermore, in the third sub-frame SF3, the first light emitting elements 11A emit green light and the second light emitting elements 11B emit red light in a time-division manner. As a result, RGB can be expressed for each of the pixels in the frame constituted by the first sub-frame SF1 to the third sub-frame SF3.

In the light emitting device 600 illustrated in FIG. 13, the area of the light emitting surface of the second light emitting element 11B that emits red light is larger than that of the first light emitting element 11A that emits blue light and green light. With such a configuration, the required luminance can be obtained even when a drive current density of the second light emitting element 11B is low, and thus, the light emitting device that maintains sufficient luminance of light having a long wavelength can be realized. As described above, when the lighting driving of the plurality of types of light emitting element 11 is performed, the luminance can be secured by increasing a chip surface of the light emitting element 11 that emits an emission color on the long wavelength side. Of course, if necessary, the area of the light emitting surface of the first light emitting element 11A can be made larger than the area of the light emitting surface of the second light emitting element 11B. In the examples of the fifth and sixth embodiments described above, examples of the active matrix driving method are described, but it goes without saying that the passive matrix driving method can also be adopted.

Seventh Embodiment

Figure 14:
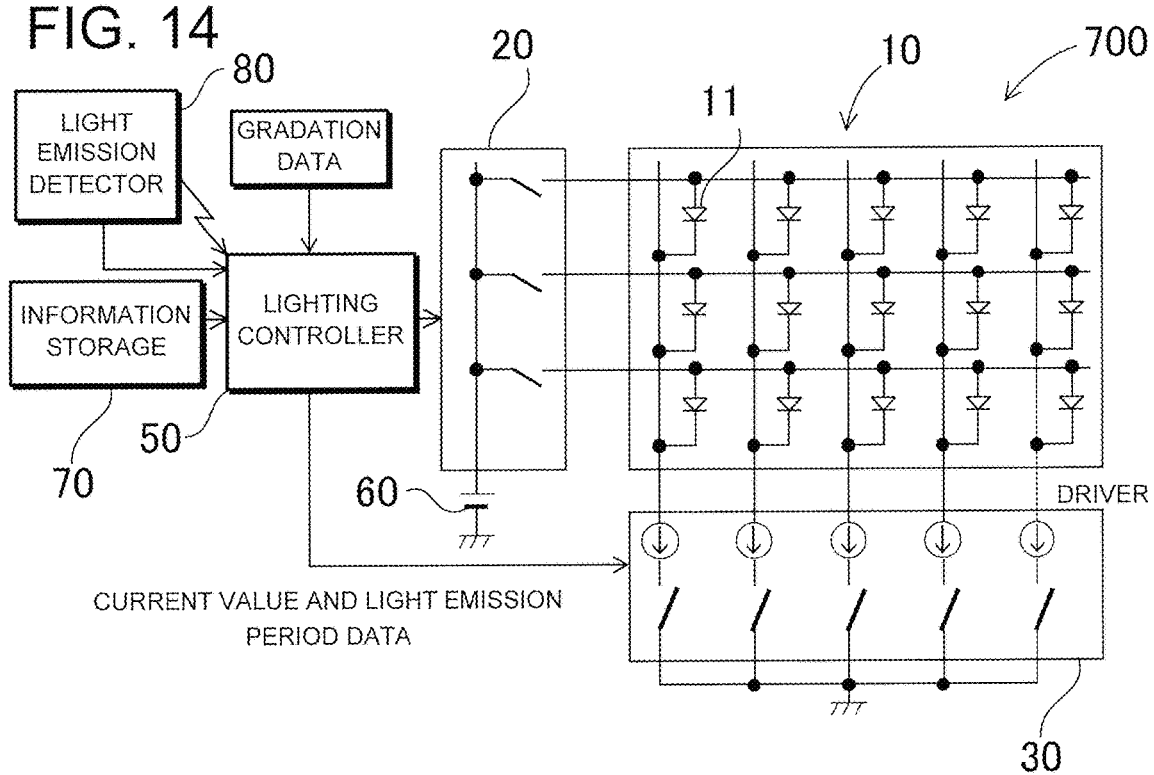
FIG. 14 is a block diagram illustrating a light emitting device according to a seventh embodiment.

Further, feedback control may be performed in which the luminance and the chromaticity when the light emitting device is actually caused to emit light are observed and the drive current value, the ON period, and the like are adjusted based on the measured values. Such an example is illustrated in FIG. 14, as a light emitting device 700 according to a seventh embodiment. The light emitting device 700 illustrated in this drawing is provided with a light emission detector 80. In this drawing, the same members as those of the light emitting devices according to each of the above-described embodiments are denoted by the same reference signs, and a detailed description thereof is omitted.

The light emission detector 80 measures the luminance and chromaticity of the light emitted from the display 10. The lighting controller 50 performs feedback control of the drive current value, the light emission period, and the ON period of each of the light emitting elements 11, based on the luminance and the chromaticity detected by the light emission detector 80. As a result, even when the light emission characteristics of the light emitting element 11 vary from one light emitting device to another, this variance is absorbed, and the influence of ambient light and the like in the environment in which the light emitting device is installed is taken into consideration. Thus, the light emission with optimum luminance and chromaticity can be realized.

Eighth Embodiment

Figure 15:
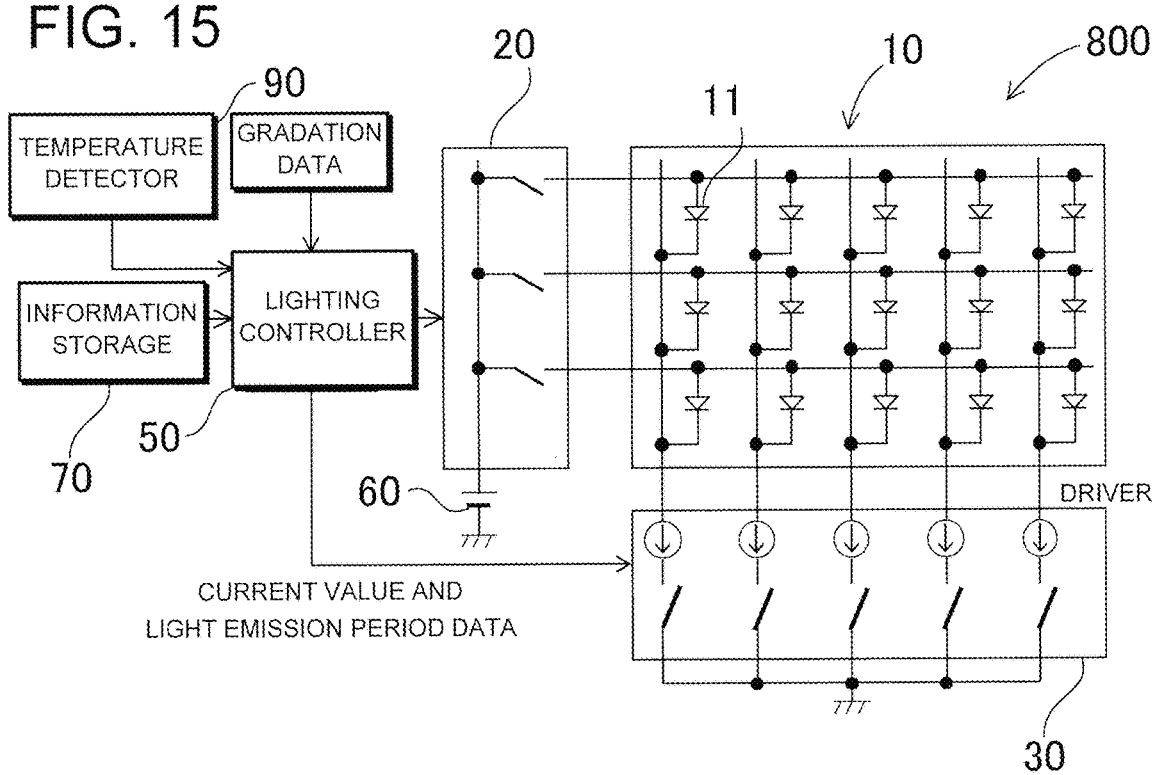
FIG. 15 is a block diagram illustrating a light emitting device according to an eighth embodiment.

Furthermore, semiconductors such as the light emitting element 11 have temperature dependence. Thus, by adopting a configuration in which the drive current is compensated for in accordance with the environmental temperature, it is possible to realize a stable operation regardless of the environmental temperature. Such an example is illustrated in FIG. 15, as a light emitting device 800 according to an eighth embodiment. The light emitting device illustrated in this drawing is provided with a temperature detector 90. In this drawing, the same members as those of the light emitting devices according to each of the above-described embodiments are denoted by the same reference signs, and a detailed description thereof is omitted.

The temperature detector 90 measures the environmental temperature. The information storage 70 has a temperature correction function of correcting the drive current of the light emitting element 11 in accordance with the temperature. The lighting controller 50 corrects the drive current of each of the light emitting elements 11 based on the temperature correction function, in accordance with the environmental temperature detected by the temperature detector 90.

Figure 16:
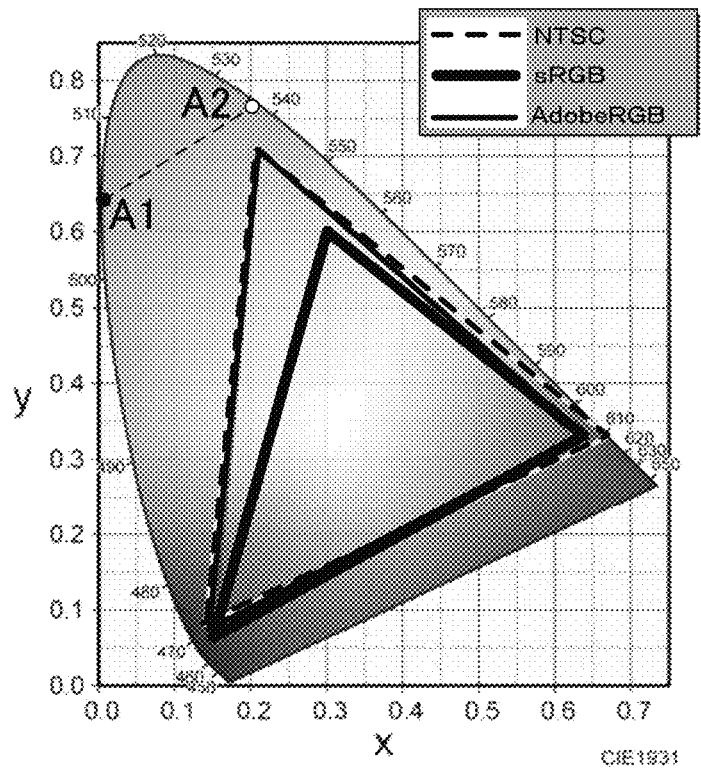
FIG. 16 is a chromaticity diagram achieving intended chromaticity using two points each of which a light emitting element emits light of a chosen wavelength.

In the first embodiment described above, an example is described in which the light emitting device is configured using the one type of light emitting element 11. As described above, it is possible to realize the light emitting device with improved color reproduction, by using the wavelength variable light emitting element in which the wavelength, that is, the emission color, is variable by the drive current value. That is, as shown in the chromaticity diagram in FIG. 16, in the related art, a color range that can be represented by a display based on a known three primary color display system, such as the NTSC standard, is restricted to a region indicated by a triangle on the chromaticity diagram indicated by a horseshoe shape, and colors outside the range of this triangle cannot be represented. In other words, in the known light emitting device, since the emission colors, in other words, the wavelengths, are generally fixed, when one pixel is expressed by using sub-pixels of the three colors of R, G, and B, for example, there is a restriction that light can be emitted only at a position defined by the light emitting elements constituting the sub-pixels of R, G, and B, that is, within the range of a triangle connecting the apexes of the emission colors plotted on the chromaticity diagram.

In contrast, in the light emitting device 100 according to the first embodiment, the wavelength of the light emitting element 11 constituting each of the pixels is caused to be variable by the drive current value, so that the emission color can be expressed over a wider range. For example, on the chromaticity diagram in FIG. 16, by using light emission conditions corresponding to colors indicated by a point A1 and a point A2, which are outside the triangles indicating each of the color regions of NTSC, sRGB, and AdobeRGB, it is possible to emit light at an arbitrary point on a broken line connecting the point A1 and the point B1. Further, when the emission color can be selected in a stepless manner, the wavelength can be directly designated from a chromaticity point on the chromaticity diagram to emit light over an even wider range.

Note that, when a light emitting diode (LED) is used as the light emitting element 11, since the spectrum of the LED has a predetermined half-width, the point A1 and the point B1 cannot be strictly located on the outer periphery of the horseshoe shape of the chromaticity diagram, but are located at positions shifted inward by the half-width. Further, when a semiconductor laser is used as the light emitting element 11, since a peaky emission spectrum having a narrower half-width can be obtained, the points can be closer to the outer periphery of the horseshoe shape of the chromaticity diagram.

Figure 17:
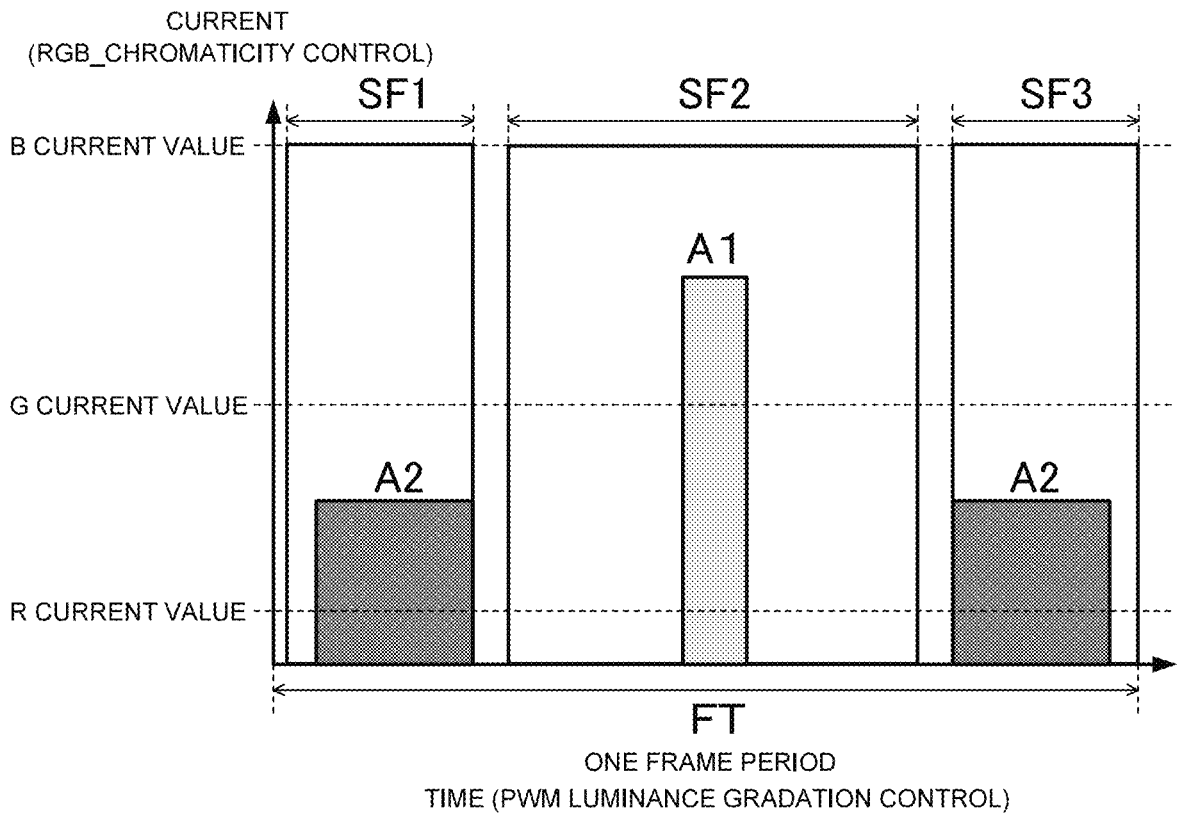
FIG. 17 is a timing chart showing lighting driving by dividing into a short wavelength light emission period and a long wavelength light emission period.

Further, as shown in a timing chart in FIG. 17, the lighting control of the light emitting device according to the present embodiment realizes a predetermined emission color by appropriately combining drive current values corresponding to two or more different wavelengths within the one frame period FT. For example, in the example in FIG. 17, a case is considered of two chosen emission colors of a long wavelength and a short wavelength. The long wavelength emission color represents the chromaticity of the xy coordinates indicated by the point A2 on the chromaticity diagram in FIG. 16 described above, and the short wavelength emission color represents the chromaticity of the xy coordinates indicated by the point A1. The one frame period FT is constituted by the first sub-frame SF1, the second sub-frame SF2, and the third sub-frame SF3, and the long wavelength light is emitted in the first sub-frame SF1, the short wavelength light is emitted in the second sub-frame SF2, and the long wavelength light is emitted in the third sub-frame SF3, respectively. The emission color of the light emitting element 11 is controlled by the drive current value, and additionally, the luminance is controlled by the light emission period. Further, the luminance averaged over the one frame is determined by the sum of the respective emission colors and luminances.

Here, by dividing the long wavelength light emission period to be arranged before and after the short wavelength light emission period, that is, by setting the long wavelength light emission period as the first sub-frame SF1 and the third sub-frame SF3 and interposing the second sub-frame SF2 which is the short wavelength light emission period therebetween, the centers of light emission time axes are aligned as described above, so that it is possible to avoid color separation. For a target emission color, for example, when an InGaN light emitting element is used, power consumption can be reduced by selecting a combination of emission colors at wavelengths that are as short as possible. This is because InGaN has more favorable light emission efficiency at a time of short wavelength light emission.

Note that, although the driving method in which the one frame is divided into the three sub-frames is described in the present embodiment also, it is also possible to further simplify the driving method in the one frame by selecting a driving method in which the third sub-frame is omitted in applications for which the specifications for color separation are more relaxed. In this case, by setting the ON period of the first sub-frame to be temporally later and the ON period of the second sub-frame to be temporally earlier, the center of the light emission time axes are caused to be closer together, so that the occurrence of the color separation can be suppressed. Further, as described in the other embodiments, a plurality of types of wavelength variable elements or wavelength fixed elements may be used in combination as the light emitting elements 11.

INDUSTRIAL APPLICABILITY

The light emitting device and the driving method thereof according to the present invention can be suitably used for a medium-sized or a large-sized display, an indicator, signage, or the like, for example.

REFERENCE SIGNS LIST 100, 100', 200, 300, 400, 500, 600, 700, 800 Light emitting device
10, 10', 10C, 10D, 10E, 10F Display
11, 11' Light emitting element; 11A First light emitting element; 11B Second light emitting element 12 Pixel
13 Memory
14 Pixel circuit
15 Active element
20 Scanner
30 Current driver; 30' Signal voltage writing circuit
50 Lighting controller
60 Power supply
70 Information storage
80 Light emission detector
90 Temperature detector
$LT_n$ n-th row light emission period; $LT_{n+1}$ n+1-th row light emission period
$LTmax_R$ Red light PWM maximum light emission period; $LTmax_G$ Green light PWM maximum light emission period; $LTmax_B$ Blue light PWM maximum light emission period $ONT_R$ Red light ON period; $ONT_G$ Green light ON period; $ONT_B$ Blue light ON period $OFT_R$ Red light OFF period; $OFT_G$ Green light OFF period; $OFT_B$ Blue light OFF period
FT One frame period
SF1 First sub-frame
SF2 Second sub-frame
SF3 Third sub-frame
A1 Color of short wavelength shown on chromaticity diagram
A2 Color of long wavelength shown on chromaticity diagram

The invention claimed is:

1. A light emitting device comprising:
a display in which a plurality of light emitting elements are arranged, the display having pixels, and the plurality of light emitting elements configured to emit light of different emission colors depending on a drive current flowing therethrough;
a current driver configured to supply the drive current to the plurality of light emitting elements;
a lighting controller configured to control the current driver to supply the drive current to each of the plurality of light emitting elements, to adjust emission color and luminance; and
an information storage configured to store current-chromaticity information used for determining a drive current value to drive a light emitting element of the plurality of light emitting elements, in accordance with the emission color to be emitted by the light emitting element,
wherein the lighting controller is configured to determine the drive current value to drive each of the light emitting elements and an ON period for turning on each of the light emitting elements, by referring to the current-chromaticity information stored by the information storage, in accordance with the emission color and gradation information for each of the light emitting elements, and to perform lighting driving of each of the light emitting elements with the drive current from the current driver,
wherein each of the light emitting elements is configured to
emit light of a first wavelength driven by a first drive current, and
emit light of a second wavelength driven by a second drive current which is greater than the first drive current, the second wavelength being shorter than the first wavelength for each of the pixels,
wherein the lighting controller is configured to determine the emission color of each of the light emitting elements by calculating a first ON period, during which each of the light emitting elements emits the emission color of the first wavelength, and a second ON period, during which each of the light emitting elements emits the emission color of the second wavelength, and
wherein the lighting controller is configured to perform driving control of each of the light emitting elements in order for a period in which the plurality of light emitting elements are turned on and off to include at least a first maximum period including the first ON period during which the light emitting element emits the light of the first wavelength and a second maximum period including the second ON period during which the light emitting element emits the light of the second wavelength in one frame forming one image on the display.

2. The light emitting device according to claim 1, wherein the lighting controller is configured to
determine the drive current value of each of the light emitting elements by referring to the current-chromaticity information in accordance with the emission color of each of the light emitting elements, and
determine the ON period of each of the light emitting elements in accordance with the drive current value and with gradation information for each of the light emitting elements.

3. The light emitting device according to claim 1, further comprising:
a memory for temporarily storing the drive current value for each of the light emitting elements,
wherein the lighting controller is configured to control the current driver based on the drive current value of each of the light emitting elements stored in the memory.

4. The light emitting device according to claim 3, further comprising:
a scanner for selecting a chosen row to be turned on, in the display in which the plurality of light emitting elements are arranged in a matrix,
wherein the display is configured to emit light by sequentially switching the chosen row selected by the scanner.

5. The light emitting device according to claim 4, wherein the lighting controller is configured to control the light emitting elements to simultaneously emit light by the current driver in which the gradation information for one image of the display is written into the memory, the gradation information corresponding to each of the light emitting elements forming the display.

6. The light emitting device according to claim 1, wherein the lighting controller is configured to
divide the one frame into a first sub-frame, a second sub-frame, and a third sub-frame temporally in this order,
allocate the first maximum period, during which the light emitting element emits the emission color of the first wavelength, to the first sub-frame and the third sub-frame, respectively, and
allocate the second maximum period, during which the light emitting element emits the emission color of the second wavelength, to the second sub-frame.

7. The light emitting device according to claim 6,
wherein the lighting controller is configured to allocate the ON period to be temporally subsequent to an OFF period during which the light emitting element is turned off in the first maximum period allocated to the first sub-frame, wherein the lighting controller is configured to allocate the ON period to be temporally interposed between OFF periods in the second maximum period allocated to the second sub-frame, and wherein the lighting controller is configured to allocate the OFF period to be temporally subsequent to the ON period in a third maximum period allocated to the third sub-frame.

8. The light emitting device according to claim 1, wherein the plurality of light emitting elements comprise
a first light emitting element configured to emit light of variable emission colors depending on the drive current, and
a second light emitting element configured to emit light of an emission color different from that of the first light emitting element with respect to the same drive current as that of the first light emitting element.

9. The light emitting device according to claim 8,
wherein for each of the pixels of the display, the plurality of light emitting elements comprise
the first light emitting element configured to emit light of the first wavelength driven by the first drive current, and to emit light of the second wavelength driven by the second drive current, and
the second light emitting element configured to emit light of a third wavelength driven by a third drive current, and to emit light of a fourth wavelength driven by a fourth drive current greater than the third drive current, and the fourth wavelength being shorter than the third wavelength,
wherein the lighting controller is configured to determine the emission color of each of the light emitting elements by calculating the first ON period during which the first light emitting element emits the emission color of the first wavelength, the second ON period during which the first light emitting element emits the emission color of the second wavelength, a third ON period during which the second light emitting element emits the emission color of the third wavelength, and a fourth ON period during which the second light emitting element emits the emission color of the fourth wavelength,
wherein the lighting controller is configured to perform driving control of the first light emitting element in order for a period in which the first light emitting element is turned on and off to include at least the first maximum period including the first ON period during which the first light emitting element emits the light of the first wavelength, and the second maximum period including the second ON period during which the first light emitting element emits the light of the second wavelength in one frame forming one image on the display, and
wherein the lighting controller is configured to perform driving control of the second light emitting element in order for a period in which the second light emitting element is turned on and off to include at least the first maximum period including the third ON period during which the second light emitting element emits the light of the third wavelength, and the second maximum period including the fourth ON period during which the second light emitting element emits the light of the fourth wavelength in one frame forming one image on the display.

10. The light emitting device according to claim 9, wherein the light of the second wavelength and the light of the third wavelength are green tone colors.

11. The light emitting device according to claim 9,
wherein the first light emitting element and the second light emitting element are arranged in the display in a staggered manner not to be aligned with each other in a vertical direction or a horizontal direction, and
wherein the lighting controller is configured to
divide the one frame into a first sub-frame, a second sub-frame, and a third sub-frame temporally in this order,
allocate the first maximum period, during which the first light emitting element emits the emission color of the first wavelength and the second light emitting element emits the emission color of the third wavelength, to the first sub-frame and the third sub-frame, respectively, and
allocate the second maximum period, during which the first light emitting element emits the emission color of the second wavelength and the second light emitting element emits the emission color of the fourth wavelength, to the second sub-frame.

12. The light emitting device according to claim 8,
wherein for each of the pixels of the display, the plurality of light emitting elements comprise
the first light emitting element configured to emit light of the first wavelength driven by the first drive current, and to emit light of the second wavelength driven by the second drive current, and
the second light emitting element configured to emit light of a third wavelength regardless of the drive current,
wherein, for determining the emission color of each of the light emitting elements, the lighting controller calculates the first ON period during which the first light emitting element emits the emission color of the first wavelength, the second ON period during which the first light emitting element emits the emission color of the second wavelength, and a third ON period during which the second light emitting element emits the emission color of the third wavelength,
wherein the lighting controller is configured to perform driving control of the first light emitting element in order for a period in which the first light emitting element is turned on and off to include at least the first maximum period including the first ON period during which the first light emitting element emits the light of the first wavelength, and the second maximum period including the second ON period during which the first light emitting element emits the light of the second wavelength in one frame forming one image on the display, and
wherein the lighting controller is configured to perform driving control of the second light emitting element in order for a period in which the second light emitting element is turned on and off to include at least the first maximum period including the third ON period during which the second light emitting element emits the light of the third wavelength in one frame forming one image on the display.

13. The light emitting device according to claim 12, wherein the third wavelength is a color having a longer wavelength than the first wavelength.

14. The light emitting device according to claim 12, wherein the third wavelength is a color having a shorter wavelength than the second wavelength.

15. The light emitting device according to claim 12, wherein an area of a light emitting surface of the second light emitting element is larger than an area of a light emitting surface of the first light emitting element.

16. The light emitting device according to claim 1, further comprising:
a light emission detector configured to measure luminance and chromaticity of light emitted from the display,
wherein the lighting controller is configured to perform feedback control of the drive current value and the ON period of each of the light emitting elements, based on the luminance and the chromaticity detected by the light emission detector.

17. The light emitting device according to claim 1, further comprising:
a temperature detector configured to measure an environmental temperature,
wherein the information storage is configured to perform a temperature correction by correcting the drive current of the light emitting element in accordance with a temperature, and
wherein the lighting controller is configured to correct the drive current of each of the light emitting elements based on the temperature correction, in accordance with an environmental temperature detected by the temperature detector.

18. The light emitting device according to claim 1, wherein the information storage is configured to store information created by measuring a drive current and an emission color of each of light emitting elements equivalent to those arranged in the display as the current-chromaticity information.

19. The light emitting device according to claim 1, wherein the information storage is configured to store information recorded by statistically determining a relationship between the drive current and the emission color of the plurality of light emitting elements as the current-chromaticity information.

20. A driving method for emitting light from a plurality of light emitting elements of a light emitting device including a display in which the plurality of light emitting elements configured to emit light of different emission colors depending on a drive current are arranged in a matrix, a current driver configured to supply the drive current to the plurality of light emitting elements, a lighting controller configured to control the current driver to supply the drive current to each of the plurality of light emitting elements to emit light of a predetermined emission color and luminance from the light emitting elements, and an information storage configured to store current-chromaticity information used for determining a drive current value to drive a light emitting element of the plurality of light emitting elements, in accordance with the emission color to be emitted by the light emitting element, the driving method comprising:
determining the drive current value with the lighting controller to drive each of the light emitting elements and an ON period for turning on each of the light emitting elements by referring to the current-chromaticity information stored by the information storage, in accordance with the predetermined emission color and gradation information for each of the light emitting elements,
determining the emission color of each of the light emitting elements by calculating a first ON period, during which each of the light emitting elements emits the emission color of a first wavelength, and a second ON period, during which each of the light emitting elements emits the emission color of a second wavelength with the lighting controller, for each of pixels of the display, each of the light emitting elements emitting light of the first wavelength driven by a first drive current, and emitting light of the second wavelength driven by a second drive current, the second drive current being greater than the first drive current, and the second wavelength being shorter than the first wavelength, and
performing driving control of each of the light emitting elements in order for a period in which the plurality of light emitting elements are turned on and off to include at least a first maximum period including the first ON period during which the light emitting element emits the light of the first wavelength and a second maximum period including the second ON period during which the light emitting element emits the light of the second wavelength in one frame forming one image on the display, with the lighting controller.

* * * * *